(12) United States Patent
Frech et al.

(10) Patent No.: US 7,238,451 B2
(45) Date of Patent: Jul. 3, 2007

(54) CONDUCTIVE POLYAMINE-BASED ELECTROLYTE

(75) Inventors: Roger E. Frech, Norman, OK (US); Daniel T. Glatzhofer, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 39 days.

(21) Appl. No.: 10/038,782

(22) Filed: Dec. 31, 2001

(65) Prior Publication Data

US 2002/0160271 A1 Oct. 31, 2002

Related U.S. Application Data

(60) Provisional application No. 60/258,754, filed on Dec. 29, 2000.

(51) Int. Cl.
*H01M 10/40* (2006.01)
*H01M 8/10* (2006.01)

(52) U.S. Cl. .................. 429/314; 429/33; 429/307; 429/317

(58) Field of Classification Search .............. 429/314, 429/317, 307, 33; 521/27, 17
See application file for complete search history.

(56) References Cited

U.S. PATENT DOCUMENTS

| | | | | |
|---|---|---|---|---|
| 3,885,069 A | * | 5/1975 | Roberts et al. ............ 427/396 |
| 3,963,806 A | | 6/1976 | Dornte | |
| 4,369,256 A | | 1/1983 | Casu et al. | |
| 4,578,326 A | * | 3/1986 | Armand et al. ............ 429/312 |
| 4,851,308 A | | 7/1989 | Akhtar | |
| 5,008,339 A | * | 4/1991 | Anson et al. ............... 525/181 |
| 5,030,527 A | * | 7/1991 | Carpio et al. .............. 429/310 |
| 5,096,561 A | * | 3/1992 | Akhtar ....................... 204/296 |
| 5,153,820 A | | 10/1992 | MacFarlane et al. | |
| 5,169,883 A | * | 12/1992 | Rainer ......................... 524/30 |
| 5,190,695 A | * | 3/1993 | Sotomura ................... 252/500 |
| 5,204,196 A | | 4/1993 | Yokomichi et al. | |
| 5,217,813 A | | 6/1993 | Roser et al. | |
| 5,283,310 A | * | 2/1994 | Armand et al. .............. 528/30 |
| 5,296,318 A | | 3/1994 | Gozdz et al. | |
| 5,300,374 A | * | 4/1994 | Agrawal et al. ............ 429/312 |
| 5,366,829 A | | 11/1994 | Saidi | |

(Continued)

FOREIGN PATENT DOCUMENTS

GB 1394473 5/1975

(Continued)

OTHER PUBLICATIONS

H. Allcock et al. "Polyphosphazenes Bearing Branched and Linear Oligoethyleneoxy Side Groups as Solid Solvents for Ionic Conduction" Macromolecules, vol. 29, No. 23 (1996) pp. 7544-7552.

(Continued)

*Primary Examiner*—Gregg Cantelmo
(74) *Attorney, Agent, or Firm*—Senniger Powers

(57) ABSTRACT

The present invention is directed to a polymer electrolyte comprising amine groups dispersed throughout the polymer backbone, including various poly(ethylenimine)-based polymers, which enable ionic movement for use in various applications, including for example batteries, fuel cells, sensors, supercapacitors and electrochromic devices. The present invention is further directed to a method for preparing such polymer electrolytes.

69 Claims, 3 Drawing Sheets

U.S. PATENT DOCUMENTS

| | | | |
|---|---|---|---|
| 5,418,091 A | | 5/1995 | Gozdz et al. |
| 5,419,984 A | * | 5/1995 | Chaloner-Gill et al. ..... 429/313 |
| 5,429,891 A | | 7/1995 | Gozdz et al. |
| 5,456,000 A | | 10/1995 | Gozdz et al. |
| 5,460,904 A | | 10/1995 | Gozdz et al. |
| 5,472,809 A | * | 12/1995 | Perton et al. ................ 429/331 |
| 5,478,668 A | | 12/1995 | Gozdz et al. |
| 5,501,919 A | | 3/1996 | Paul et al. |
| 5,540,741 A | | 7/1996 | Gozdz et al. |
| 5,552,239 A | | 9/1996 | Gozdz et al. |
| 5,554,459 A | | 9/1996 | Gozdz et al. |
| 5,571,634 A | | 11/1996 | Gozdz et al. |
| 5,585,039 A | | 12/1996 | Matsumoto et al. |
| 5,599,355 A | | 2/1997 | Nagasubramanian et al. |
| 5,607,485 A | | 3/1997 | Gozdz et al. |
| 5,609,795 A | | 3/1997 | Matsumoto et al. |
| 5,643,665 A | | 7/1997 | Saidi |
| 5,648,186 A | | 7/1997 | Daroux et al. |
| 5,789,106 A | * | 8/1998 | Rosenmeier et al. .......... 429/33 |
| 5,840,087 A | | 11/1998 | Gozdz et al. |
| 5,840,371 A | | 11/1998 | Warren |
| 5,874,184 A | | 2/1999 | Takeuchi et al. |
| 5,922,493 A | | 7/1999 | Humphrey, Jr. et al. |
| 5,928,391 A | | 7/1999 | Lewin |
| 5,952,126 A | | 9/1999 | Lee et al. |
| 5,961,671 A | | 10/1999 | Guindy et al. |
| 5,964,903 A | * | 10/1999 | Gao et al. ................... 29/623.1 |
| 5,972,054 A | | 10/1999 | Yotsuyanagi et al. |
| 5,972,055 A | | 10/1999 | Gao et al. |
| 5,985,477 A | | 11/1999 | Iwasaki et al. |
| 5,994,426 A | | 11/1999 | Nezu et al. |
| 5,998,559 A | | 12/1999 | Narang et al. |
| 6,010,798 A | | 1/2000 | Hammerschmidt et al. |
| 6,013,393 A | | 1/2000 | Taniuchi et al. |
| 6,030,728 A | | 2/2000 | Cotte et al. |
| 6,045,934 A | | 4/2000 | Enami |
| 6,096,453 A | * | 8/2000 | Grunwald ................... 429/212 |

FOREIGN PATENT DOCUMENTS

| | | | |
|---|---|---|---|
| JP | | 62140306 A * | 6/1987 |
| JP | | 06329793 A * | 11/1994 |
| WO | WO 99/33125 | | 7/1999 |

OTHER PUBLICATIONS

C. K. Chiang et al. "Poly(ethylene imine)-Sodium Iodide Complexes" Macromolecules, vol. 18, No. 4 (1985) pp. 825-827.

C. K. Chiang et al. "Polymeric Electrolyte Based on Poly(ethylene imine) and Lithium Salts" Solid State Ionics, vol. 18 & 19 (1986) pp. 300-305.

C. S. Harris et al. "Complex Formation of Poly(ethylenimine) with Sodium Triflate and Conductivity Behavior of the Complexes" Macromolecules, vol. 19, No. 4 (1986) pp. 987-989.

C. S. Harris et al. "Ionic Conductivity in Branched Polyethylenimine-Sodium Trifluoromethanesulfonate Complexes. Comparisons to Analogous Complexes Made With Linear Polyethylenimine" Macromolecules, vol. 20, No. 8 (1987) pp. 1778-1781.

Le Nest et al., Polymer Communicaitons, vol. 28 (1987) pp. 302-305.

G. Nazri et al. "Polyphosphazene Electrolytes for Lithium Batteries" Chemistry of Materials, vol. 1, No. 3 (1989) pp. 370-374.

C. G. Overberger et al. "Synthesis of Poly(Ethylene Glycol Methyl Ether)-b-Poly(Ethylenimine) and its Derivatives Containing Thymine and Amino Acids as Pendants" J. of Polymer Sci.: Part A: Polymer Chem. Ed., vol. 24 (1986) pp. 2797-2813.

T. Takahashi et al. "Chemical Modification of Poly(ethylene imine) for Polymeric Electrolyte" Solid State Ionics, vol. 18 & 19 (1986) pp. 321-325.

R. Tanaka et al. "Ionic conduction in poly(ethylenimine)- and poly(n-methylenimine)-lithium salt systems" Solid State Ionics, vol. 60 (1993) pp. 119-123.

M. Watanabe et al. "Protonic Conduction in Poly(ethylenimine) Hydrates" Macromolecules, vol. 20, No. 5 (1987) pp. 968-973.

S. York et al. "A Comparative Vibrational Spectroscopic Study of Lithium Triflate and Sodium Triflate in Linear Poly(ethylenimine)" Electrochemica Acta, vol. 46 (2001) pp. 1533-1537.

T. Saegusa et al. "Isomerization Polymerization of 2-Oxazoline. I. Preparation of Unsubstituted 2-Oxazoline Polymer" Polymer Journal, vol. 3, No. 1 (1972) p. 35-39.

R. Tanaka et al. "High Molecular Weight Linear Poly(ethylenimine) and Poly(N-methylethylenimine)" Macromolecule, vol. 16, No. 6 (1983) p. 849-853.

Tsuchida et al. "Single-Ion Conduction in Poly[(oligo(oxyethylene) methacrylate)-co-(alkali-metal methacrylates)]" Macromolecule, vol. 21, No. 1 (1988) pp. 96-100.

T. Saegusa et al. "Crystalline Polyethylenimine" Macromolecule, vol. 5, No. 1 (1972) p. 108.

Partial International Search received in analogous application No. PCT/US01/50140 dated Jul. 29, 2003.

International Search Report received in analogous application No. PCT/US01/50140 dated Oct. 24, 2003.

* cited by examiner

CONDUCTIVE POLYAMINE-BASED ELECTROLYTE

REFERENCE TO RELATED APPLICATION

This application claims priority from U.S. provisional application, U.S. Ser. No. 60/258,754, filed on Dec. 29, 2000.

STATEMENT REGARDING FEDERALLY SPONSORED RESEARCH

The invention disclosed herein was made in part with Government support under Award Number 0072544, from the National Science Foundation. The Government has certain rights in this invention.

BACKGROUND OF THE INVENTION

In general, the present invention is directed to a polymer comprising amine groups dispersed throughout the polymer backbone which enable ionic movement for use in various applications. More specifically, the present invention is directed to a conductive polyamine-based polymer electrolyte, which may optionally be cross-linked and which is suitable for use in, for example, batteries, fuel cells, sensors, supercapacitors and electrochromic devices, as well as to methods for the preparation thereof.

Society continues to place more and more stringent demands on existing sources of energy, requiring that they be more efficient, more environmentally friendly, etc. For example, as developments in microelectronics continue to advance, the need for smaller, lighter, more powerful, and/or longer lasting energy sources increases. As a result, existing battery technologies have been stretched to their limits, requiring new technologies to be developed. Similarly, as environmental issues, such as pollution or emission controls and resource conservation, continue to be given more attention, alternative energy sources, such as the use of high energy density batteries or fuel cells, grow in importance.

Currently, efforts remained focused on the development of improved secondary, or rechargeable, cells, having high energy densities. While there are many different types of secondary cells, lithium ion cells are an area of emphasis because, as compared to most other systems, they possess longer lifetimes and higher capacities. Generally speaking, current state-of-the-art lithium cells, or batteries, consist of (i) a cathode, (ii) an anode, both of which are made of a material capable of intercalating/deintercalating lithium ions (the positive electrode intercalating during discharge and the negative electrode during charge), lithium being preferred because it is a high specific energy material, and (iii) an electrolyte. More specifically, current secondary lithium cells employ lithium metal or lithium ions in carbon as the anode, a chalcogenide salt (such as, for example, $Li_xMn_2O_4$, $Li_xCoO_2$, $LiV_3O_8$ and $Li_xNiO_2$) as the cathode, and a liquid or solid electrolyte. During discharge of a cell having lithium metal as the anode, lithium metal is oxidized into lithium ions at the anode, the ions then undergoing an intercalation reaction at the cathode; the reverse process at each electrode occurs during charging of the cell. For cells where both the anode and cathode are made of lithium ion intercalation materials, lithium metal is not involved and all redox processes occur in the intercalate matrix.

The composition or form of the electrolyte employed in these cells is of particular interest. For example, while many liquid electrolytes have high conductivities, their use is problematic because of concerns over leakage of hazardous materials and loss of performance resulting from drying due to evaporation and/or leakage. Solid electrolytes are particularly attractive since they offer new opportunities in design that are not available with liquid electrolytes. For example, solid polymeric electrolytes possessing elastomeric properties are attractive because they would be able to expand/contract within the cell to ensure continuous and full interfacial contact with the electrodes as volume changes within the cell occur in operation; additionally, such elastomeric properties would enable cells containing these electrolytes to be more easily fabricated. Another advantage of solid electrolytes is the fact that they would essentially eliminate concerns over leakage and drying problems experienced with liquid compositions. Finally, such electrolytes may be formed into thin films to minimize resistance and to reduce overall volume and weight of the cell.

Polymers which have been examined for use as solid electrolytes include those based upon linear chain polyethers, such as poly(ethylene oxide) ("PEO") and poly(propylene oxide) ("PPO"), with associated alkali metal salts (see, e.g., Le Nest et al., *Polymer Comm.*, 28, pp. 302–305 (1987); and, Tsuchida et al., *Macromol.*, 88, pp. 96–100 (1988)). However, such electrolytes display conductivity in the range of practical use (e.g., $\sigma = 10^{-5}$ to $10^{-3}$ S/cm) only at temperatures well above room temperature. In addition to exhibiting poor conductivity, particularly at room temperature, acceptable physical properties are lacking as well; for example, these polymers typically form thin films which are tacky (the polymers at times being too close to the liquid state), brittle, or too heat sensitive. While many of the deficiencies in physical properties may be addressed by the addition of a plasticizer, poor conductivity remains an issue. Additionally, while some have proposed the use of gel electrolytes (such as those containing poly(vinylidene fluoride), or "PVdF"), these too have been found to exhibit insufficient conductivity at room temperature, and to lack desirable physical properties (see, e.g., U.S. Pat. No. 5,998, 559). One very common problem with gel electrolytes, often formed by the addition of an electrolytic solution to a polymer matrix, is that they have problems with leakage or evaporation of the electrolyte solution, the matrix being unable to contain the electrolyte solution over time.

Due to its structural similarities to PEO and PPO, others have also investigated the use of poly(ethylenimine) ("PEI"), as well as various derivatives thereof, as a solid polymer electrolyte. (See, e.g., Yokomichi et al., U.S. Pat. No. 5,204,196; M. Watanabe et al., *Macromol.*, 20, pp. 968–73 (1987); J. Paul et al., *Electrochimica Acta*, 37, pp. 1623–25 (1992); and, R. Tanaka et al., *Solid State Ionics*, 60, pp.119–23 (1993).) However, while various forms of PEI have been studied, including (i) linear PEI, (ii) a PEI polymer backbone with PEO side chains extending from the nitrogen atoms in the backbone, and (ii) branched PEI (including methylated PEI), a commercially viable PEI-based electrolyte has not been produced; that is, while various forms of PEI have been studied, as yet no form has been identified as an electrolyte having both electrical and mechanical properties making it suitable for use in commercial applications.

In view of the foregoing, it can be seen that a need continues to exist for a solid polymer electrolyte suitable for use in a number of commercial applications. Ideally, the electrolyte would possess high conductivity while having superior mechanical properties (i.e., strength, elasticity, electrochemical stability, etc.) for the desired application. In addition, such an electrolyte would be easily and inexpensively manufactured, and capable of being formed, extruded, etc. into any of a number of desired shapes or forms.

SUMMARY OF THE INVENTION

In accordance with the present invention, therefore, is provided a polymer electrolyte, as well as a process for the preparation thereof, having a number of amine groups in the polymer backbone; the provision of such an electrolyte wherein one or more of the amine groups are covalently cross-linked; the provision of such a cross-linked electrolyte which additionally contains a dissolved or dispersed metal salt and which may optionally be swollen with a solvent; and, the provision of such an electrolyte wherein the swelling solvent is a plasticizing solvent.

Further provided is a dry polymer electrolyte, as well as a process for the preparation thereof, having a metal salt dissolved or dispersed therein; the provision of such an electrolyte wherein the polymer has a number of amine groups in the polymer backbone and one or more solvent moieties attached thereto which enable dissolution or dispersion of the metal salt; the provision of such an electrolyte wherein one or more of the amine groups is covalently cross-linked; and, the provision of such an electrolyte which may optionally be swollen with a solvent, such as for example a protic solvent.

Briefly, therefore, the present invention is directed to a covalently cross-linked polymer electrolyte comprising amine groups in the polymer backbone and a dissolved or dispersed metal salt therein.

The present invention is further directed to a covalently cross-linked polymer comprising amine groups in the polymer backbone and one or more solvent moieties bound thereto, and optionally a dissolved or dispersed metal salt therein.

The present invention is still further directed to a fuel cell. The fuel cell comprises (i) a proton-conducting, covalently cross-linked polymer electrolyte membrane, the polymer comprising amine groups in the polymer backbone and labile protons; (ii) an anode in contact with a first side of the membrane; and, (iii) a cathode in contact with a second side of the membrane, which is opposite said first side.

The present invention is still further directed to a battery. The battery comprises an anode, a cathode, and a conductive polymer electrolyte disposed there between and in contact therewith, wherein said polymer electrolyte is covalently cross-linked and comprises amine groups in the polymer backbone and a metal salt dissolved or dispersed therein.

The present invention is still further directed to a gradient battery. The gradient battery comprises a continuous, covalently cross-linked polymer film, the polymer film comprising metal ions, an anodic region, a cathodic region, and an electrolyte region disposed there between which, during charge or discharge of the battery, enables the passage of metal ions from one electrode region to the other.

Other objects and features will be in part apparent and in part pointed out hereinafter.

DETAILED DESCRIPTION OF THE PREFERRED EMBODIMENTS

Figure 1:
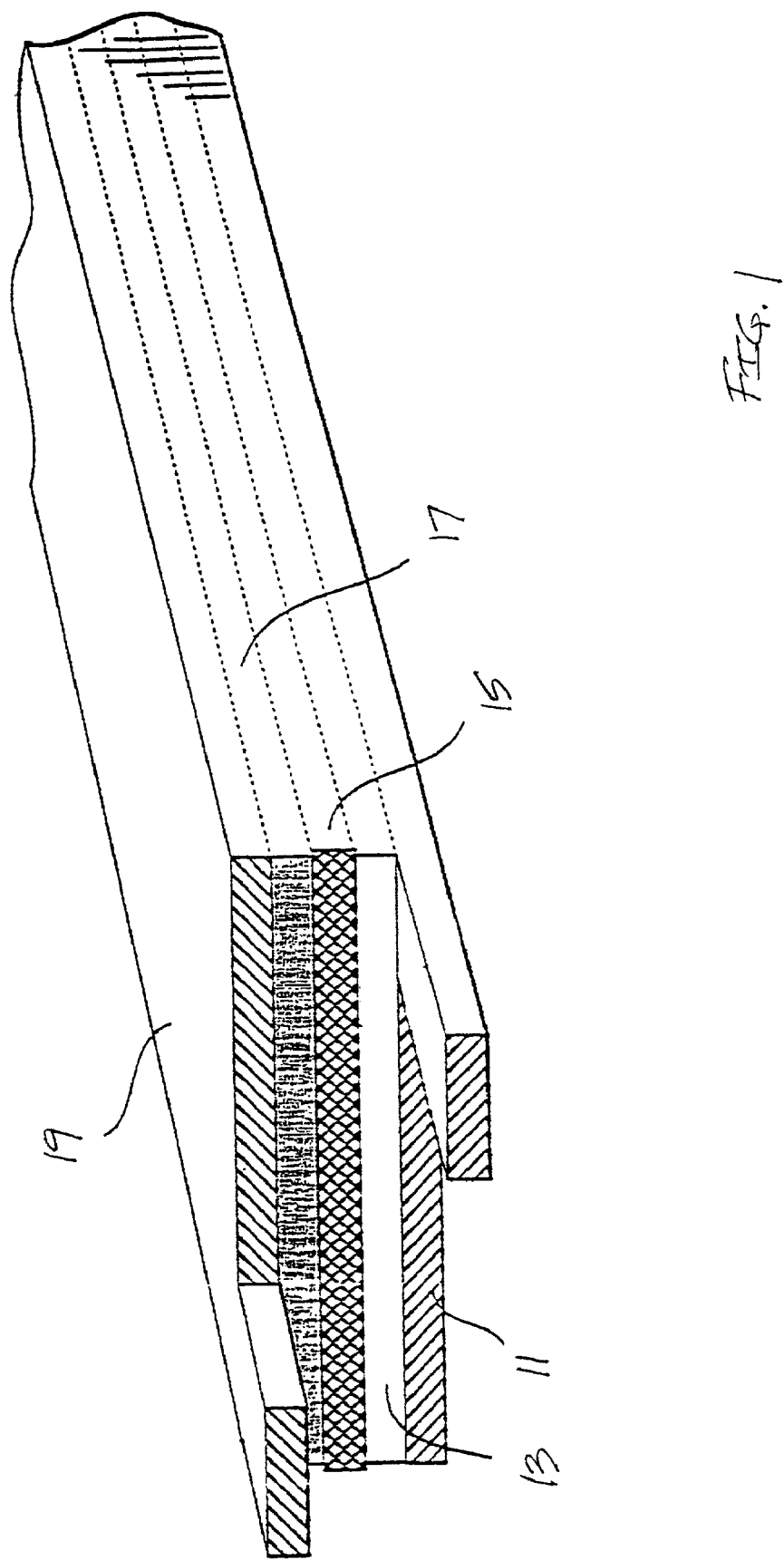
FIG. 1 is a schematic diagram of a basic battery cell structure employing the electrolyte of the present invention.

In accordance with the present invention, a conductive polymer has been discovered which has desirable mechanical properties (e.g., strength, elasticity, flexibility) and electrical properties (e.g., high conductivity for metal ions as well as protons), as well as excellent processability. The polymer is suitable for use as an electrolyte in, for example, fuel cells, sensors, supercapacitors, electrochromic devices, and batteries (e.g., primary or gradient, as further described herein).

The present polymer comprises amine groups in the polymer chain or backbone. The polymer may be linear or branched, and may be covalently cross-linked. The polymer further comprises, for one or more embodiments as further described herein: (i) a dissolved or dispersed metal salt; (ii) an attached or tethered solvent moiety; (iii) a swelling solvent; and/or (iv) labile protons. In still other embodiments, the polymer may be in the form of a covalently cross-linked, low density, continuous, homogeneous film (as compared, for example, to conventional PEI polymers, such as those prepared by Takahasi et al., *Solid State tonics,* 18 & 19 (1986) pp. 321–25, which were formed by pressing and heating a paste of a dissolved metal salt, linear PEI and diepoxyoctane; a continuous film, in contrast, being substantially free of the chemical boundaries present in electrolytes formed in this way).

In still other embodiments, the polymer is used to construct a gradient battery, or a battery wherein a single, continuous electrolyte phase extends from one collector to the other. More specifically, in this embodiment the polymer is used to prepare a battery wherein a single, continuous, covalently cross-linked polymer film contains an anodic region, a cathodic region, and an electrolyte region disposed there between. Such a battery is advantageous because the cross-linked polymer act as a continuous matrix or network for the composite anode, separator and composite cathode regions, such that essentially no macro-scale interfaces exist between them. Such a structure is quite unlike conventional batteries, wherein the anode, separator or electrolyte and cathode are individual layers laminated or in some other way bound together on a macro-scale, such that large or macro-scale interfaces are present between these separate and distinct entities. A gradient battery is a significant improvement over, for example, common battery structures wherein the anode and cathode have polymeric binders which differ from the electrolyte material.

Additionally, the present invention is directed to a process for preparing such polymer electrolytes. In particular, the present invention is directed a polymer electrolyte, and a method for the preparation thereof, wherein linear or branched polyalkylamines (e.g., poly(ethylenimine)) are cross-linked in solution, with or without ions (e.g., metal ions or protons) or a plasticizer present, in order to maintain disorder in the solid state upon the evaporation of at least a portion of the solvent. Such a process yields a less crystalline or non-crystalline polymer electrolyte matrix, thus improving the physical properties thereof for its intended use. As noted, such a process is well-suited for, among other things, a battery having a continuous electrolyte phase (i.e., a gradient battery).

Polymer Composition

Repeat Unit

As noted, the polymer electrolyte of the present invention has a polymer backbone which comprises amine groups (i.e., imino groups, or groups wherein a nitrogen atom is present, attached to which is typically a hydrogen or a hydrocarbylene (e.g., an alkylene or arylene) group, as further described herein). More specifically, the polymer comprises a repeat unit generally represented by formula (1):

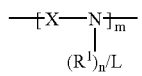
(1)

wherein: (i) N is nitrogen, to which is optionally bound a substituent, $R^1$, a cross-linker, L, or both; (ii) $R^1$ is one or more substituents (e.g., n being 1 or 2), as further described herein, free of covalent bonds to a polymer chain or backbone other than the polymer backbone containing the nitrogen atom to which it is covalently bound; (iii) L is a covalent cross-linker, as further described herein, connecting one or more amine group nitrogen atoms in one polymer chain to amine group nitrogen atoms in another polymer chain; (iv) X generally represents the remaining portion of the repeat unit, as further described, and (iv) m represents the number of repeat units in a given polymer segment.

It is to be noted that, as indicated above, the nitrogen atom may be attached to a cross-linker, L, a substituent, $R^1$, or both, or alternatively multiple substituents (e.g., when n=2). It will therefore be understood that, in some embodiments, the repeat unit of the polymer backbone may have different compositions, depending upon which segment is being referenced or described (e.g., differently substituted nitrogen atoms may be scattered randomly throughout the polymer backbone, or similarly-substituted nitrogen atoms may appear in sequence over some length or segment of the polymer backbone).

It is to be further noted that while typically cross-linking within the polymer involves the amine group nitrogen atoms, cross-linking may additionally or alternatively occur at other sites within the polymer, as further described herein. Accordingly, it is to be understood that cross-linking within the polymers of the present invention may be other than herein described without departing from the scope of the invention.

The polymers of the present invention may be linear or branched. More specifically, the amine groups or repeat units may be arranged linearly, such as for example in the case of a polymer having the general formula (2):

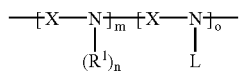
(2)

where for example each nitrogen in the polymer chain or backbone is attached (randomly or in some order) to a substituent, $R^1$, or a cross-linker, L, as well as to another amine repeat unit (or, in the case of a copolymer, a different repeat unit, which is not shown here, as further described below). Alternatively, one or more of the amine groups or repeat units may be branched, such as for example in the case of a polymer having the general formula (3):

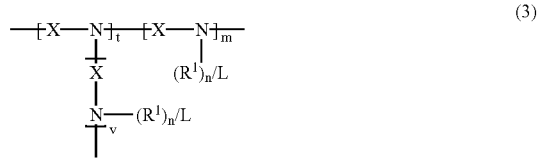
(3)

where one or more amine group nitrogens in the polymer chain or backbone at which branching occurs, rather than being bound or attached to a substituent, $R^1$, or a cross-linker, L, is bound to another amine repeat unit.

It is to be noted that while typically a nitrogen atom is not bound to another nitrogen atom in the polymer, to form an extended chain (e.g., more than about 2) of nitrogen atoms, in some embodiments two nitrogen atoms may be bound together, such as in the case of a hydrazine derivative being present in the polymer backbone, at a branching site, or a site where substitution or cross-linking occurs.

The polymers of the present invention comprise amine groups or repeat units which are typically spaced apart to some degree by a group X. Generally speaking, X represents the non-nitrogen portion of a monomer used to form the polymer, such as the alkyl portion of a poly(alkylamine) (e.g., the ethylene portion of poly(ethylenimine), "PEI", or the propylene portion of poly(propylenimine), "PPI", generally represented by repeat units (4) and (5), respectively, wherein $R^2$ through $R^7$ may be the same or different, each being generally defined the same as $R^1$ herein).

(4)

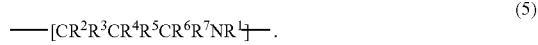
(5)

Alternatively, or additionally, X may represent the non-nitrogen portion of a repeat unit of one or more additional amine-containing monomers; that is, in some embodiments, the polymer of the present invention may be a copolymer formed by means of polymerizing two different amine group-containing monomers, such as in the case of a polymer formed from poly(ethylenimine) and poly(propylenimine), X thus representing both the ethylene and propylene portions of the two repeat units.

Accordingly, it is to be understood that X may be essentially anything known in the art, or which may be identified by routine experimentation, that enables a polymer electrolyte to be obtained that is suitable for purposes of the present invention; that is, X may be essentially anything which enables a polymer to be obtained having the desired combination of conductivity and mechanical properties for the particular application of interest. Typically, however, X represents one or more hydrocarbylene or heterohydrocarbylene moieties (as further defined herein) on the polymer backbone, which may be the same or different.

With respect to copolymers, it is to additionally be noted that the polymer of the present invention may be a copolymer wherein an amine group-containing monomer is copolymerized with a non-amine group-containing monomer, the polymer thus having, for example, a backbone generally represented by the formula (6):

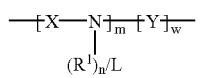  (6)

wherein Y generally represents the repeat unit the non-amine group-containing polymer segment of the copolymer. For example, both substituted or unsubstituted poly(amines), such as substituted or unsubstituted PEI or PPI, may be copolymerized with substituted or unsubstituted (a) polyethylene, (b) polypropylene, (c) poly(ethylene oxide), (d) poly(propylene oxide), (e) poly(ethylene sulfide), or (f) poly(propylene sulfide), generally represented by repeat units (7) through (12), respectively (Y representing one or more of these repeat units).

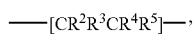 (7)

 (8)

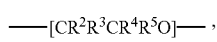 (9)

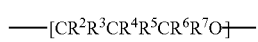 (10)

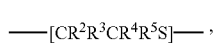 (11)

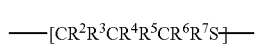 (12)

It is to be noted that while formula (6) generally represents a block copolymer, essentially any type of copolymer known to those of skill in the art (e.g., random, graft), or which may be identified by routine experimentation, may be employed in the present invention. Furthermore, it is to be understood that Y may be essentially anything known in the art, or which may be identified by routine experimentation, that enables a polymer electrolyte to be obtained that is suitable for purposes of the present invention; that is, Y may be essentially anything which enables a polymer to be obtained having the desired combination of conductivity and mechanical properties for the particular application of interest. Suitable examples of Y include represents one or more hydrocarbylene or heterohydrocarbylene moieties (as further defined herein, and including those referenced above) in the polymer backbone, which may be the same or different.

The relative density of the amine groups, or the number of atoms which separates one amine group from another, may vary, the desired configuration being at least in part dependent upon the given composition of the polymer itself (i.e., whether the polymer backbone comprises only hydrocarbylene and amine repeat units, whether the polymer backbone is substituted or unsubstituted and, if substituted, what the substituents are) as well as the particular application of interest (i.e., whether the resulting polymer will be swollen with a solvent, as further described herein). In those cases wherein essentially only the amine groups of the polymer chain or backbone participate in conductivity or transport, preferably these units are separated by about 1 to about 4, and more preferably about 2 to about 3, atoms in the polymer backbone. Without being held to a particular theory, it is generally believed that, in those applications wherein the polymer is swollen with a solvent, it is desirable for the nitrogens to be spatially proximate, such that conductivity is optimized, while preventing them from becoming too tightly packed. This spatial arrangement is particularly preferred for swollen systems because, depending upon the particular solvent employed, some degree of favorable hydrogen bonding, or other alternative interaction (e.g., dipole-dipole, dipole-induced dipole, or Van der Waals), may occur between the solvent and the nitrogen atoms which promote conductivity.

It is to be noted, however, that the above range of "separating atoms" may change as other sites in the polymer backbone, in the substituent or, when present, in the cross-linker, are introduced into the polymer which may act as sites for: (a) protonation (such as in the case of proton transfer applications), (b) tethering or attachment of solvent moieties (such as in the case of dry electrolyte applications), or (c) ion transport (such as in the case of lithium battery applications). Without being held to a particular theory, it is generally believed that as the number of these additional sites increases, the distance between amine groups may also increase. Common examples of such alternative sites include other heteroatoms (e.g., oxygen, sulfur, etc.), as well as aromatic structures.

It is to be further noted that, in some embodiments, the intervening units which act to separate the amine groups (i.e., X or Y) are preferably heterohydrocarbylene; that is, in some embodiments it is preferable to have repeat units separating the amine units which contain one or more heteroatoms in the polymer chain. Particularly preferred "spacers" include, for example, alkylene oxides (e.g., ethylene oxide, propylene oxide, etc.) and alkylene sulfides (e.g., ethylene sulfide, propylene sulfide, etc.), among others.

It is to be still further noted that, in view of the spacing considerations described above (i.e., the distance between amine groups), when copolymers are formed, in at least some embodiments random copolymers or graft copolymers are preferred over block copolymers, particularly copolymers having a block which does not contain amine groups, or more specifically a block which is not conductive. (Block copolymers wherein the non-amine group containing block comprises another conductive polymer, such as block-PEO-block-PEI, may be desirable in some instances.) It is believed that the presence of a polymer block which does not contain amine groups may decrease conductivity of the copolymer, particularly if this block is long or regular enough to allow for crystallization, especially with a salt present. However, block copolymers possessing non-conducting blocks may be of interest, for example, if phase separation forms well-connected, highly conducting domains or if domains of the non-conducting blocks offer some enhancement of mechanical properties.

Substituents

The nitrogen atoms of the amine groups may be substituted or unsubstituted and, if substituted, the substituent may be the same or different; that is, the polymer backbone may be formed from a single amine-containing monomer or a mixture of different amine-containing monomers. When substituted, the substituent may be a side group, $R^1$, attached to the polymer backbone or it may be a cross-linking group, L. $R^1$ represents one or more substituents independently selected from the group consisting of hydrogen, substituted or unsubstituted hydrocarbyl or heterohydrocarbyl, as further described herein. However, it is to be noted that while the substituent(s) may be essentially anything, both the composition of the substituent(s), as well as the degree of substitution, are to be controlled so as to optimize conductivity and those mechanical properties of interest. For example, the composition of the substituent(s), as well as the degree of substitution, are to be controlled so as to prevent crystallization from occurring, which will detrimentally impact both conductivity as well as elasticity or flexibility of the polymer electrolyte. Local crystallization can occur, for example, in those regions of the polymer where the substituent becomes too long or large.

Additionally, it is to be noted that, in some embodiments, substituents are preferably selected to promote the overall conductivity and/or mechanical performance of the polymer. For example, conductivity of some polymer compositions may be increased by the use of aryl, heteroaryl, heterohydrocarbyl (such as heteroalkyl), as well as ionic substituents; that is, generally any substituent, or alternatively the solvent used to swell the polymer, that will weakly interact with, and promote the mobility of, the ion (e.g., a metal ion or proton) present may be used to increase the overall conductivity of the polymer.

Cross-Linking

As previously noted, when substituted, the substituent may be a side group $R^1$ attached to the polymer backbone or it may be a cross-linking group L, attaching one or more of the amine group nitrogens of one polymer chain to a site in another polymer chain, which typically is an amine group nitrogen in another polymer chain; that is, cross-linking may occur between amine groups in different polymer chains, or between an amine group and some other group in a different polymer chain. Generally speaking, cross-linking is preferred in at least some embodiments of the present invention because, without being held to a particular theory, it is believed to impart favorable electrical and mechanical properties to the resulting polymer electrolyte; that is, when controlled, cross-linking is believed to have a desirable impact on both conductivity as well as the elastic properties of the electrolyte.

The precise degree of cross-linking will vary, at least in part dependent upon the particular make-up of the polymer itself as well as the desired electrical and/or mechanical (or more specifically the dilatometric) properties. For example, generally speaking, as the degree of branching within a given polymer increases, the degree of cross-linking needed to achieve the desired result decreases. With respect to the desired electrical properties, it may generally be stated that the degree of cross-linking is typically (i) sufficiently high, such that crystallization of the amine group-containing segment is sufficiently suppressed (i.e., to ensure this segment is sufficiently amorphous, such that ionic conductivity is not retarded), and (ii) sufficiently low, such that segmental motion can occur, and such that not all of the ion coordination sites are occupied. Stated another way, with respect to the desired mechanical properties, cross-linking will generally be controlled such that the resulting polymer remains within the realm of elastomers; that is, the degree of cross-linking is generally controlled such that, on the lower end, the polymer will not flow (i.e., the polymer is spatially or dimensionally stable, such that it will not flow out of the container it is in), while on the upper end, the polymer is not so stiff as to be unable to stretch or expand within a given application so as to maintain essentially complete and continuous contact between electrodes (i.e., the polymer is not so cross-linked that it becomes hard/inflexible, such that upon use it becomes brittle/frayable). Such limitations are common among electrolytes currently employed in the art and are specifically overcome by the electrolytes of the present invention. Typically, however, the degree of cross-linking will be controlled so as to reach the point at which an infinite network is formed, ranging from about 1%, 5%, 10% or even 15% to less than about 100%, and in some embodiments ranging from about 20% to about 90%, from about 30% to about 80%, from about 40% to about 70%, or even from about 50% to about 60%.

In this regard it is to be noted that, in addition to performance of the electrolyte, the degree of cross-linking is also an important manufacturing consideration. More specifically, in addition to the control of cross-linking to ensure the electrolyte meets desired performance criteria, cross-linking is also controlled to ensure the electrolyte may be easily handled for purposes of commercial fabrication of the end-product in which it is contained. For example, in battery applications, the ability to extrude or form very thin, flexible films is desirable. Accordingly, in some embodiments the degree of cross-linking may be less than about 90%, 80%, 70%, 60%, 50%, 40%, 30%, 20%, 10% or even 5%.

It is to be further noted that while in some embodiments typically substantially all cross-linking occurs between amine groups of one polymer chain and amine groups of another (i.e., at least about 50%, 65%, 75%, 85%, 95% or more of the cross-links are formed between amine groups), in some embodiments cross-linking may occur between other sites in the polymer chain, depending upon the composition of the polymer. For example, depending upon the particular composition of the polymer backbone, as well as substituents attached thereto, the particular cross-linker employed, and/or the method of cross-linking (e.g., irradiation, condensation, etc.), cross-linking may also or alternatively occur between (i) the nitrogen of the amine group and a different position on the backbone (i.e., main chain or a branch) of another polymer chain, (ii) the nitrogen of the amine group and a substituent, (iii) between two substituents, (iv) between two sites in different polymer chains other than the nitrogen atoms of the amine groups (as further described herein below). However, in those instances wherein cross-linking occurs only between amine group nitrogens in the polymer, or between an amine group nitrogen and some other atom in the polymer, the degree of cross-linking will typically be controlled such that the ratio of primary to secondary, secondary to tertiary or tertiary to quaternary nitrogen atoms ranges from about 25:1 to about 5:1 (i.e., about 4% to about 20% tertiary nitrogens present in the polymer), or even from about 20:1 to about 10:1 (i.e., about 5% to about 10% tertiary nitrogens present in the polymer).

Generally speaking, in one embodiment essentially any cross-linking agent, or combination of cross-linking agents, known in the art to be suitable for amine-containing polymers or polymerizations may be employed in the present invention. More specifically, in principle, essentially any multi-functional molecule that will react with, for example, secondary or tertiary amine functionalities to form covalent bonds (e.g., anhydrides, bisanhydrides, bisMichael-type acceptors and diesters) may be suitable as cross-linkers for poly(amine) species for certain ion transport applications, depending upon the exact use conditions. Accordingly, L typically represents one or more linkers independently selected from the group consisting of substituted or unsubstituted hydrocarbylene or heterohydrocarbylene, as further described herein. For example, L could be a derived from crosslinkers such as dihalocarbonyl or dihaloalkyl compounds, dihaloalkyl ethers or thio ethers, or α,β-unsaturated carbonyl (e.g., aldehyde or ketone) compounds.

It is to be noted, however, that selection of the cross-linker or cross-linkers will at least in part be dictated by the application of interest. More specifically, while generally any multi-functional molecule that will react with, for example, a secondary or tertiary amine site to form a covalent bond could be used as a cross-linker, preferably a cross-linker will be selected to yield a resulting functional group that is inert to, or even acts to enhance, the ion transport application for which the material will be used. For example, in lithium anode systems, both the base polymer and the cross-linker functionality are preferably not reduced by the lithium. Difunctional alkyl and alkylarenes that have two or more leaving groups that allow nucleophilic substitution reactions to take place with the nucleophilic nitrogen atoms (e.g., 1,3-dibromopropane; 1,3-diiodohexane; 1,6-dibromohexane; 1,2-dichloroethane; di(bromomethyl)benzenes;1,7-heptanediol ditosylate, etc.) will produce cross-linked networks. In the case of PEI, for example, these cross-linkers produce tertiary ammonium functional groups with acidic protons that could be reduced by the lithium (producing flammable hydrogen gas), and potentially "kill" the system. However, these sites can be neutralized by treatment with base to form suitably inert tertiary amine sites. On the other hand, reaction of these cross-linkers with N-alkylpolyamines (e.g., poly(N-methylethylenimine), or PMEI) would produce quaternary ammonium functional groups which would be largely inert to the lithium and neutralization would not be needed. Either type of polymer (e.g., amine or alkylamine)/cross-linker, however, may be suitable for the so-called "rocking chair" type of system, wherein only lithium ions move and thus there is no metallic lithium, provided in this latter case that the system does not interact detrimentally with either the cathode or the anode to degrade performance either physically (e.g., cause delamination) or chemically (e.g., cause passivation).

In the case of proton transfer or conducting applications or systems, such as in fuel cells, either type of polymer (e.g., amine or alkylamine)/cross-linker system may be suitable (because typically labile protons will be present and/or added anyway). However, for such applications or systems, the covalent cross-link formed is preferably not hydrolyzed or cleaved under use conditions (e.g., strongly acidic/aqueous environment). For example, the above-described dihaloalkyl systems would generally yield cross-links capable of withstanding such use conditions. Cross-linkers for the poly(amine) systems, such as diacid chlorides and diisocyanates, among others, however would be susceptible to acid hydrolysis, the mechanical properties therefore being degraded under use conditions. Diepoxides, on the other hand, may be suitable cross-linkers, if elimination of the resulting alcohol functional cross-linkers under strongly acidic conditions does not lead to degradation of the covalent link (which is likely the case, elimination to form a carbon-carbon unsaturated bond and water typically occurring, which is generally not of concern). A somewhat unusual cross-linker involves reaction of a poly(amine) system with a β-dicarbonyl species, such as malonaldehyde. Although the cross-linking reaction initially leads to a β-diimine cross-link, which is susceptible to acid hydrolysis, an acid-catalyzed rearrangement to a β-iminoenamine cross-link occurs, which is considered to be quite stable to strongly acidic conditions. Thus, cross-linked gels can be formed by taking appropriately concentrated aqueous solutions of PEI salts (e.g., PEI hydrochloride) at room temperature and adding malonaldehyde bis(dimethylacetal), for example. Acids, such as 85% phosphoric acid, may be added to the solutions to accelerate the reaction and provide a highly acidic gel medium after evaporation of water. In principle, other β-dicarbonyl compounds or suitable precursors could be used.

Alternative Approach to Cross-linking

It is to be noted that, in an alternative to the cross-linking embodiments described above, unsaturated bonds can also be incorporated into the polymer backbone to provide potentially alternative sites for cross-linking, using for example standard vulcanization techniques (e.g., sulfur or peroxide based cross-linking). Unsaturated bonds could also be incorporated into side chains off the polymer backbone during the synthesis process or by modification, partial or complete, of the amine groups with unsaturated functional groups (e.g., by reaction with allyl chloride or acryloyl chloride). Other reactive functional groups could also be incorporated as side chains off the polymer backbone during the synthesis process or by modification, partial or complete, of the amine groups with moieties containing the reactive functionality. An example of the latter may be Michael reaction of PEI with acrylonitrile to modify the amine functionalities with —$CH_2CH_2CN$ side chains. The nitrile functionalities could be thermally trimerized in the presence of acids to form triazine cross-links. As is known to one skilled in the art, literally any molecule that reacts with the amine functionality and leaves another reactive functional group available for cross-linking could be used. Another example may be reaction with acrylate esters to form —$CH_2CH_2COOR$ groups pendant to the amine groups. The ester groups could then be cross-linked by reaction with primary diamines to form diamide cross-links. Many other possibilities exist; for example, there is the possibility of cross-linking the poly (amine) chains directly by radiation or free radical H-abstraction techniques (e.g., peroxides or azo cross-linkers). However, such techniques are typically not preferred in most embodiments because they tend to be more costly and complicated.

Electrolyte Preparation/Composition

It is to be noted that the polymers, from which the polymer electrolytes of the present invention are obtained, may be prepared by any means known in the art. For example, in a first embodiment the present invention is directed to a covalently cross-linked polymer electrolyte, the polymer comprising amine groups and a dissolved or dispersed metal salt. Common examples of suitable polymers include cross-linked, linear or branched polyalkylamines (e.g., poly(ethylenimine)), which may be used alone or as part of a larger copolymer structure. Although some linear polyalkylamines, such as linear PEI, are available commercially, due to their relatively low molecular weights (e.g., less than about 1,000), higher molecular weights may be prepared for purposes of the present invention by, for example, a known process wherein a ring-opening polymerization reaction is performed using the corresponding 2-alkyloxazoline, to obtain the polymeric amide. The polymeric amide can then be hydrolyzed to obtain the desired polyalkylamine. More specific preparations include:

1. Linear PEI: Linear poly(N-acetyl ethylene imine) is first prepared by the methyliodide-initiated ring-opening polymerization of 2-methyloxazoline in a dimethyl formamide solution, the resulting linear poly(N-acetyl ethylene imine) then being hydrolyzed (in, for example, a sodium hydroxide solution at about 100° C.) to form linear PEI (see, e.g., T. Saegusa et al., *Polymer J.*, 3, 35 (1972) or *Macromol.*, 5,108 (1972)). Alternatively, linear PEI can be prepared from poly(2-ethyloxazoline), which is commercially available in a wide range of molecular weights (e.g., 50,000; 200,000; 500,000; from Aldrich Chemical Co.), by means of acid hydrolysis to obtain the hydrochloride salt (which can be used directly with certain cross-linkers to form proton-conducting materials), followed by neutralization. (See, also, R. Tanaka et al., *Macromol.*, 16, 849 (1983), for an additional method of preparing linear PEI).

2. Linear PPI: Linear PPI, or poly(propylenimine), also referred to as poly(trimethylenimine), can be prepared using a similar ring-opening reaction, wherein 5,6-dihydro-4H-1,3-oxazine is opened to obtain the corresponding polyamide, having a repeat unit, —[$CH_2CH_2CH_2N$(CHO)]—, which is then hydrolyzed to yield the final product.

Branched polyalkylamines (e.g., branched PEI) are more readily available commercially in comparatively larger molecular weights. For example, branched PEI can be obtained directly from commercial sources (see, e.g., Aldrich Chemical Co.), typically having a ratio of 1:2:1 of primary:secondary:tertiary amines with branching sites about every 3 to 3.5 nitrogen atoms, in various molecular weights (e.g., 1,000; 10,000; 50,000). However, these too may be prepared by a ring opening pathway, wherein for example aziridine, or one of the various homologs or analogs thereof, is used.

It is to be noted that the polymers of the present invention may be prepared by means other than herein described without departing from the scope of the present invention. For example, in addition to the methods described above, polymers suitable for use in the preparation of the present polymer may be prepared using common free radical polymerization techniques with known monomers having carbon-carbon unsaturated bonds. Additionally, it is to be noted that the polymers of the present invention can be homopolymers, or copolymers prepared from two or more different monomers. The copolymers, in turn, can be random copolymers, block copolymers or graft copolymers.

It is to be further noted that the molecular weight (i.e., the number average molecular weight, $M_n$) of the polymers to be used is an important factor to consider, in that a lesser degree of cross-linking a given polymer is typically needed for higher molecular weights in order to achieve the same or similar mechanical properties, relative to that polymer's lower molecular weight counterpart. For example, as the molecular weight increases, less cross-linking is necessary in order to form a gel electrolyte suitable for use in, for example, battery applications. Less cross-linking, in turn, results in the formation of a polymer which is easier to work with, from a commercial manufacturing point of view. Higher molecular weights are also preferred in some instances because cross-linking efficiency is increased (fewer cross-links being needed in order to achieve, for example, an "infinite" network).

Additionally, while molecular weight has no substantially direct impact on conductivity, it does impact conductivity indirectly. For example, as molecular weight decreases, the degree of cross-linking preferably increases to maintain the desired mechanical properties. A higher degree of cross-linking, in turn, can make the polymer more difficult to swell (swelling, as further described herein, is typically achieved more easily when the degree of cross-linking is low because the polymer can stretch more easily). Accordingly, molecular weight will preferably be optimized for a given polymer composition in order to obtain the desired balance of conductivity and mechanical properties. Typically, however, $M_n$ ranges from greater than about 1,000 to about 1 million or more, while in some embodiments $M_n$ ranges from about 5,000 to about 750,000, from about 10,000 to about 500,000, from about 25,000 to about 250,000, or even from about 50,000 to about 100,000. In some preferred embodiments, $M_n$ is about 20,000, 40,000, or even 80,000.

Covalent cross-linking can be achieved during the polymerization process, or alternatively after the polymer has been formed, using cross-linking agents known in the art. The precise quantity of cross-linking agent used, relative to the number of potential sites where cross-linking may occur, is controlled in order to achieve the desired degree of cross-linking within the polymer; that is, the quantity of cross-linking agent is adjusted in order to achieve the desired combination of mechanical properties and conductivity within the resulting polymer. For example, the ratio of molecules of cross-linker to number of polymer repeat units may range in some embodiments from about 1:5 to about 1:50, from about 1:10 to about 1:40, or from about 1:20 to about 1:30. However, it is to be noted that the precise ratio may vary with the desired application (e.g., for PEI and metal salt applications, the ratio may range from about 1:20 to about 1:40, while for proton applications the ratio may range from about 1:10 to about 1:20).

In this regard it is to be noted that, in at least some embodiments, cross-linking it preferably achieved after the polymerization process is complete, by means of dissolving the polymer in a suitable solvent and then performing a suitable cross-linking reaction. Without being held to a particular theory, it is generally believed that cross-linking "in solution" is advantageous because, once cross-linking is complete, the polymer chains are trapped in a very random, or "solution-like" state, which is believed to impart favorably mechanical properties to the polymers (e.g., flexibility, tensile strength, etc.).

One or more metal salts may be incorporated into a polymer, in order to form an electrolyte of the present invention, by means known in the art or as further described herein. For example, the metal salt can be present during polymerization and/or cross-linking or, alternatively, the metal salt may be introduced into the cross-linked polymer subsequent to polymer preparation (such as by "swelling" the polymer, as further described herein below). Accordingly, it is to be understood that the manner by which the metal salt is introduced into the cross-linked polymer can be other than herein described without departing from the scope of the present invention.

Swelling

Swelling can be achieved in different ways. For example, if the swelling agent is non-volatile, such as a plasticizer, non-volatile diluent, or acid, it may be present in the desired concentration during the cross-linking process, as long as it does not (i) interfere substantially with the cross-linking process (as in the case of, for example, the addition of phosphoric acid in a PEI system to be cross-linked by a dihalide, protonation of the nitrogens acting to retard the cross-linking reaction), or (ii) phase separate substantially during the cross-linking process. After evaporation of the volatile solvent (if any is present), the non-volatile additive will remain within the membrane; the same is true of any salts present.

A second approach to swelling is to form the membranes/films without additives or salts present, and then soak the membranes in a solvent containing the additive, plasticizer, or salt or a mixture of several of these. As the polymer swells with the solvent, the various additives will also be taken into the membrane. On evaporation of the volatile solvent, if present, the non-volatile additives will remain in the membrane; in some cases, one of the additives may also act as the swelling solvent (e.g., in the case of liquid plasticisers or diluents).

The first approach is in some instances preferred over the second, because in the second approach (i) the number of operations needed to fabricate a membrane of the desired composition is increased, and (ii) the amount of each additive taken up by the membrane will be harder to control, as the method relies on either establishing an equilibrium concentration for each additive between the swelling solution and membrane or by controlling the uptake volumetrically (i.e., knowing how much the membrane will swell in a given solvent and adjusting the additive concentrations to leave the right or desired amount of additive after evaporation). However, the second approach is advantageous in that (i) in certain cases, it can be somewhat easier to keep the systems anhydrous, and (ii) many different systems could be made from a single generic "stock" membrane type; that is, the system could be tailored "after the fact" without having to make a new membrane formulation each time.

In those instances wherein the metal salt is introduced into the polymer after it has been prepared, and either before or after it has been cross-linked, typically this is achieved by swelling the cross-linked or non-cross-linked polymer with a solvent containing a metal salt to form the electrolyte. This is achieved by contacting the polymer with a metal salt-containing solvent (or, alternatively, a solvent to which is then added a metal salt) for a period of time sufficient to ensure the desired concentration of metal ions in the polymer, and thus the desired conductivity of the polymer, is achieved. In preparation, the concentration of polymer in solution can vary, for example the ratio of the weight of the polymer to the volume of solution ranging from about 1:100 (g:ml) to about 1:10, or from about 1:80 to about 1:20 (e.g, values of about 1:80, 1:60, 1:40, and 1:20). Likewise, the ratio (wt:wt) of salt to polymer, and when present cross-linker to polymer, in solution can also vary, for example each ratio ranging independently from about 1:50 to about 2:1, or from about 1:25 to about 1:1 (e.g., about 1:25, 1:20, 1:15, 1:10, 1:5, 1:1 or more).

It is to be noted that the upper and/or lower limits for polymer concentration in solution can also vary, the ratio being controlled in part in order to control the overall rate of reaction, for example the rate of cross-linking increasing as the concentration of the polymer or cross-linker in solution increases, the solvent thus acting to slow the reaction to some manageable rate. It is to be further noted that the reaction temperature and/or pressure can be changed in order to increase or decrease the rate of the reaction and/or solvent evaporation; likewise, the reaction time may also vary, typically ranging from several minutes (e.g., about 5, 10, 20, 40, 60 or more) to a few hours (e.g., about 2, 5, 10 15, 20 or more) and up to several days (e.g., 2, 4, 6 or more), the reaction time being at least in part a function of (i) the polymer molecular weight, (ii) the degree of polymer branching, (iii) the concentration of polymer in solution, (iv) the ratio of polymer to cross-linker, and/or (v) the reaction temperature and/or pressure.

Once prepared, the concentration of metal in the polymer electrolyte is typically expressed in terms of the ratio of heteroatoms to metal ions in the swollen polymer; that is, this concentration is expressed as the ratio of heteroatoms present, regardless of the source (e.g., the polymer backbone, substituent side chains, or solvent), to metal atoms present. This range will vary depending upon, for example, the desired conductivity, the metal ion or ions employed, the composition of the polymer itself, the solvent employed, as well as the desired mechanical properties of the resulting electrolyte. Typically, however, this ratio will range, for some embodiments, from less than about 40:1 (heteroatoms to metal ions) to greater than about 2:1, from about 30:1 to about 3:1, from about 20:1 to about 4:1, or even from about 10:1 to about 5:1.

In this regard it is to be noted that, in most cases, if the ratio of heteroatoms to metal ions becomes too low, crystallization can occur. Therefore, preferably this ratio will be controlled so as to optimize conductivity and mechanical properties, while also controlling crystallization. However, crystallization will not occur at the same ratio for all systems, and for some systems crystallization may not occur at all. As a result, for some systems it is possible for this ratio to be less than about 2:1 (i.e., about 1:1 or less), making possible a "polymer in salt" condition (rather than a "salt in polymer" condition).

Essentially any solvent which is compatible with the polymer and in which the desired metal salt is sufficiently soluble, such that the salt may be introduced into the polymer matrix and remained dissolved or dispersed therein, may be employed; that is, essentially any solvent which has a high affinity for the polymer electrolyte, and which will solublize the metal salt of interest but not the polymer itself, may be used. A solvent having a high affinity for the polymer is desirable in order to avoid leakage of liquid from the cell containing the electrolyte during use. Leakage is a common problem with most commercially used electrolytes, which creates environmental as well as performance problems (conductivity decreasing as the electrolyte begins to dry as a result of leakage or evaporation). The present polymer electrolytes in some embodiments therefore comprise a swelling solvent which, as noted above, results in essentially no leakage or evaporation during use (i.e., less than about 5 weight percent, less than about 2 weight percent, less than about 1 weight percent, less than about 0.5 weight percent, or even less than about 0.1 weight percent of the solvent, relative to the total weight of the polymer, is lost during prolonged use).

Plasticizing solvents are particularly preferred, due to the improvement in performance which results, for example, by increasing polymer flexibility. Generally speaking, these solvents preferably have limited solubility for (non-cross-linked) polymeric binders in the anode or cathode (if present, such as in some battery applications). Suitable plasticizing solvents typically have a medium to high boiling point, typically greater than about 100° C. (i.e., about 125° C. to about 500° C., or from about 150° C. to about 250° C.), which simplifies manufacturing and acts to extend shelf-life of the end product, a low vapor pressure, a high dielectric constant, a low viscosity, and are compatible with the components of the electrochemical cell of which the electrolyte is a part.

In this regard it is to be noted that, in a preferred embodiment, non-cross-linking additives, such as a plasticizer, are added prior to the addition of the cross-linking agent.

Common examples of solvents suitable for use in the present invention include: alkyl or aryl esters (e.g., butyl, hexyl, 2-ethoxyethyl, phenyl, benzyl 2-(2-ethoxyethoxy)-ethyl acetates) or diesters (e.g., dimethyl, diethyl, dipropyl, dibutyl, diphenyl oxalates, succinates, adipates, suberates, azelates, sebacates and phthalates); lactones (e.g., gamma-butyrolactone and 3-methyl-gamma-butyrolactone); alkyl or aryl carbonates (e.g., ethylene, propylene, butylene, dimethyl, diethyl, dipropyl, dibutyl, bis(2-methoxyethyl), methyl ethyl, methyl propyl, ethyl propyl, methyl isopropyl, and methyl methoxyethyl carbonates), alkyl or aryl phosphates (e.g., trimethyl, triethyl, tripropyl, tributyl, triphenyl, tritolyl and unsymmetric phophates); acrylates; amides (e.g., dimethyl formamide, dimethyl acetamide); nitriles (e.g., benzonitrile); borates, sulfolanes (e.g., tetrahydrathiophene dioxide); sulphates; 1,2-dimethoxyethane; methyl formate; dimethylsulfoxide; methyl pyrrolidine; glymes of various repeat numbers (i.e., mono, di, tri, tetraglyme, etc.); tetraalkyl ureas; various ionic liquids; organic phosphoramides; as well as various mixtures thereof. In addition, low molecular weight polymers (e.g., polyesters, polyacrylates, polycarbonates and polyacrylonitries, among others, typically having molecular weights of less than about 5000, 1000, or even 500) may also be used. In some embodiments, preferred plasticizers include esters (e.g., 2-(2-ethoxyethoxy) ethyl acetate), diesters (e.g., dimethyl adipate and dibutyl phthalate), carbonates (e.g., propylene carbonate), phosphates, acrylates, borates, sulfolanes, sulphates and glymes. Alternatively, in other embodiments water, methanol or propanol (e.g., isopropanol) can be employed.

It is to be noted that swelling may be achieved for both metal ion and proton conducting applications, by various solvents known in the art and/or described herein. For example, for proton conduction applications, essentially any solvent that will swell the polymer and remain inert to the polymer under acidic conditions could be used, including water, $H_3PO_4$ (e.g., 85% solution), $H_2SO_4$, or trifluoromethane sulfonic acid.

Essentially any metal salt which can be dissolved or dispersed in an appropriate solvent compatible with the polymer of interest (i.e., having a high affinity and low solubility for the polymer) may be employed, for purposes of examining the conductivity of the polymer with that particular metal ion. Typically, however, salts of transition metals (e.g., Ni, Cu, Ru, Ag), alkali metals (e.g., Li, Na, K, Rb, Cs) or alkaline earth metals (e.g., Mg, Ca, Sr) may be used in the present invention. Current state-of-the-art rechargeable batteries employ lithium-based salts, including for example $LiPF_6$, $LiSCN$, $LiAsF_6$, $LiClO_4$, $LiN(CF_3SO_2)_2$, $LiC(CF_3SO_2)_2$, $LiBF_4$, $LiCF_3SO_3$, and $LiSbF_6$. However, alternative metal salts, such as those based on sodium (e.g., NaSCN) or Ca, or Cu (e.g., copper(II)chloride) may also be employed.

In preparation, the concentration of metal salt in the swelling solvent may vary, depending upon for example the polymer electrolyte composition, the solvent or combination of solvents to be employed, and the desired concentration of solvent and/or salt in the polymer to be achieved. Typically, the concentration of the metal salt in the swelling solvent ranges from a few weight percent (relative to the total weight of the solution), up to about the saturation limit of the metal salt in the solvent or combination of solvents being used. In some embodiments, however, the salt concentration ranges from about 0.1 weight percent to about 10 weight percent, from about 0.2 weight percent to about 8 weight percent, from about 0.4 weight percent to about 6 weight percent, from about 0.8 weight percent to about 4 weight percent, or even from about 1 weight percent to about 2 weight percent, relative to the total weight of the solution.

Although the final concentration of the metal salt and/or the swelling solvent in the polymer electrolyte will vary, once the swelling process is completed, the concentration of solvent in the electrolyte will, in some embodiments, range from a few weight percent (e.g., about 1, 2, 4, 6, 8, 10 or more weight percent), based on the total weight of the electrolyte, to several tens of weight percent (e.g., about 10, 20, 40, 60, 80 or more). Typically, however, this concentration will be less than about 50 weight percent, less than about 25 weight percent, less than about 10 weight percent, less than about 5 weight percent, or even less than about 1 weight percent, relative to the total weight of the swollen polymer electrolyte. In addition, the salt concentration typically ranges from about 1 weight percent to about 20 weight percent, from about 2 weight percent to about 15 weight percent, from about 4 weight percent to about 12 weight percent, or even from about 6 weight percent to about 10 weight percent, relative to the total weight of the swollen polymer electrolyte. Again, however, in other embodiments, this concentration may be greater than 20 weight percent (e.g., 30, 40, 50 weight percent or more).

In this regard it is to be noted that, in those embodiments wherein a swelling solvent is not used (such as, for example, when a solvent moiety is present in the polymer, as described herein), the concentration of metal salt in the polymer electrolyte may be other than described above.

"Dry" Polymer Electrolytes

In addition to those embodiments of the present invention wherein the polymer electrolytes are swollen with a metal salt-containing solvent, polymer electrolytes of the present invention may alternatively be used for the same or similar purposes without the need of a swelling solvent. More specifically, metal salts may be incorporated into these polymers, and maintained in a dissolved or dispersed state therein, without the need of a swelling solvent by means of, for example, the inclusion of a "solvent moiety" in the polymer. The solvent moiety may be included in the polymer by tethering (i.e., covalently bonding) the moiety to the finished polymer (backbone, side chain or substituent) or, alternatively, to the monomer prior to polymer synthesis. In some embodiments, a "dry" polymer electrolyte is formed because, as a result of these moieties, no solvent is needed to enable the metal salt to remain in a dissolved or dispersed state within the polymer.

As used herein, "solvent moiety" refers to a solvent molecule, or a portion thereof (i.e., a solvent residue), which has been covalently bound to the polymer and which acts to enable a metal salt to be solublized or dispersed within the polymer. However, it is to be noted that this may simply be viewed as a modification of monomer or polymer itself (thus providing a new monomer or polymer composition). Regardless of the manner in which it is viewed, referring again to formula (1), it is to be noted that in this embodiment, in some cases $R^1$ may additionally or alternatively represent a solvent moiety (in those instances wherein the solvent moiety is bound to a nitrogen of an amine group), as well as a non-solubilizing substituent. Suitable solvents from which the solvent moiety may be derived include essentially any solvent suitable for use as a swelling solvent, as described herein. Alternatively, the solvent moiety may be, for example, heteroakyl (e.g., alkoxy, such as —$O(CH_2CH_2O)_bCH_3$, where b ranges from 1 to about 6, or from about 2 to about 4). Particularly preferred "moieties" are those derived from solvents which act as a plasticizer for the polymer and which interact with ions dissolved or dispersed in the polymer matrix (e.g., glymes, such as poly(N-2-(2-methoxyethoxy)ethyl)ethylenimine, wherein an alkoxy substituent is tethered to the nitrogen atom); other ether linkage-containing moieties, such as THF; amide functional solvents, such as dimethylformamide, dimethylacetamide and N-methylpyrrolidone; dimethylsulfoxide; sulfolane; nitriles, such as acetonitrile; and, carbonates, such a propylene carbonate).

As a result of the fact that the solvent (in the form of the solvent moiety) is now a part of the polymer itself, rather than simply being adsorbed therein, many of the limitations or problems common in conventional systems using swollen electrolytes are eliminated. For example, leakage and/or evaporation are essentially no longer a problem because a liquid solvent is not needed for purposes of maintaining the metal salt in the polymer. Stated another way, in swollen systems, the solvent is used for purposes of dissolving the metal salt and maintaining the salt in a dissolved or dispersed state within the polymer electrolyte. However, in the present embodiment, it is the bound solvent moieties which act to ensure the salt, once introduced, remains dissolved or dispersed within or throughout the polymer electrolyte. As a result, a swelling solvent is typically unnecessary for purposes of achieving a final product; that is, while a solvent may be used to "swell" the polymer, in order to introduce the metal salt into the polymer, this solvent may subsequently be removed (by, for example, evaporation), leaving behind the metal salt in a dissolved or dispersed state.

Generally speaking, in those instances wherein only the solvent moiety is to be responsible for maintaining dissolution or dispersion of the metal salt in the polymer electrolyte, the number of solvent moieties present in the polymer is preferably sufficient to ensure a concentration of metal salt within the polymer which is high enough to achieve the desire conductivity, while still maintaining the necessary mechanical properties; that is, the number of solvent moieties present in the polymer is preferably optimized in order to achieve the highest performance of the polymer electrolyte, in terms of both conductivity and mechanical stability. For example, the ratio of solvent "moieties" to polymer repeat units may range, in some instances, from about 1:40 to greater than about 1:1 (e.g., about 1:30, 1:20, 1:10, 1:8, 1:6, 1:4, 1:2); that is, this ratio may range from about 1:40 to about 1:1, from about 1:30 to about 1:2, from about 1:20 to about 1:4, or even from about 1:10 to about 1:6.

However, while a high concentration of solvent moieties is desirable for purposes of maximizing metal salt concentration, the impact this has on the degree of cross-linking is to be considered. This is because the solvent moiety concentration, in turn, impacts the mechanical performance of the polymer. More specifically, in those instances wherein cross-linking and solvent moiety attachment can only occur at the nitrogen of the amine groups, a tradeoff may exists between solvent moiety concentration and degree of cross-linking. As a result, in some embodiments preferably both the solvent moiety concentration and the degree of cross-linking are optimized to achieve the desired combination of conductive and mechanical properties.

With regard to the "trade-off" between solvent moiety concentration and cross-linking, it is to be noted, however, that there are exceptions. For example, in the case of cyanoalkylated (e.g., cyanoethylated) LPEI, near complete substitution does not appear to hinder cross-linking. Additionally, in the case of tertiary amines, cross-linking is still possible with the proper cross-linker (e.g., dihalides but not bis-acetals).

It is to be further that, in cases wherein solvent moiety attachment and cross-linking occurs at the same nitrogen, the formation of an ammonium salt results. Although this can be a complication in some instances, the complication may be alleviated by the introduction of a substituent on the monomer which acts as an alternative site for (i) solvent moiety tethering, and/or (ii) cross-linking. Alternatively, the solvent moiety could, for example, be built into the cross-linker, such that cross-linking and introduction of the solvent moiety occurs at the same time by the use of a single compound. However, in a preferred embodiment, the nitrogens of the amine groups have only hydrogens, solvent moieties or cross-linkers attached thereto.

Typically, incorporation of the solvent moiety into the final polymer electrolyte composition is achieved by chemically modifying the monomers used prior to the polymerization reaction. Alternatively, however, in some embodiments the solvent moieties may be tethered, grafted or bound to the polymer backbone after polymerization has been completed.

The preparation of such polymer electrolytes may be achieved by means known in the art. For example, alkylation can occur at these sites by treating the polymer with an aldehyde or carboxylic acid under appropriate conditions in the presence of a reducing agent, such as sodium borohydride. More specifically, propionitrile moieties can be attached, for example, to a portion of the nitrogen atoms by conjugate addition with acrylonitrile in refluxing methanol. Such an approach can be used to modify, for example, 50%, 75%, 95% or more of the nitrogen atoms.

Proton Transport

In yet another embodiment, the polymers of the present invention may be utilized as electrolytes for applications (e.g., fuel cells) involving proton transport or conductance. The present polymers are particularly well-suited for such applications because, due to the presence of the amine groups within the polymer, they possess the inherent ability to form labile protons. Stated another way, because the amine group nitrogens may form primary, secondary, or tertiary ammonium salts (as a result of, for example, polymerization, substitution, cross-linking, etc. at the nitrogen atoms), the polymers may in some instances be inherently protonated (i.e., protons are inherently present within the polymers, not being introduced by means of the addition of a protic solvent for example).

Although a polymer of the present invention may or may not have some inherent degree of proton conductivity once prepared, in general proton conductivity may be further enhanced, or imparted, by the introduction of additional protons. As described above with respect to the metal salt containing polymers, the introduction of protons may be achieved during the polymerization process or, alternatively, after the polymerization process has been completed. Generally speaking, the concentration of protons in the polymer is increased by introducing a protic solvent into it; that is, the polymer may in some embodiments be "swollen" with a protic solvent.

Regardless of the manner by which protons are introduced into the polymer, typically a concentration of protons will be introduced which is sufficient to achieve a desirable level of conductivity. Generally speaking, the desired concentration of protons may be expressed relative to the number of protonation sites in the polymer itself. For example, when the polymer is comprised only of saturated carbon-hydrogen, carbon-nitrogen and/or nitrogen-hydrogen bonds (e.g., the case of PEI or PPI), essentially only the lone pair of electrons on each nitrogen atom may act as a site for protonation. In this case, the ratio of protons to nitrogen atoms is typically greater than zero and less than about 1 (e.g., about 0.2:1, 0.4:1, 0.6:1, or even 0.8:1); that is, in order for there to be proton mobility within the polymer electrolyte, the polymer electrolyte is typically not fully protonated.

It is to be noted in this regard that as the composition of the polymer changes and other potential sites for protonation are introduced (for example, other heteroatoms in the backbone, side chains or linkers), the ratio of protons to nitrogen atoms may be other than herein described. However, in such instances, the relative limits on proton concentration still apply; that is, when other potential sites of protonation are present, the relative ratio of protons to all protonation sites is still typically greater than zero and less than about 1. However, it is to be further noted that while typically a polymer electrolyte is not fully protonated, full protonation may be possible in some embodiments. More specifically, although a fully protonated electrolyte is not typically preferred, in some embodiments such a system may be desirable. For example, depending upon the particular protic solvent employed for swelling (e.g., phosphoric acid), an acceptable conductivity may be achieved under fully protonated conditions.

Generally speaking, essentially any solvent which will generate protons in the presence of the polymer electrolyte, and thus impart conductivity thereto, may be used. As with the solvents employed in the metal salt application above, these protic solvents preferably have a high affinity for the polymer composition, in order to significantly limit, and preferably avoid, leakage and evaporation (i.e., less than about 5 weight percent, less than about 2 weight percent, less than about 1 weight percent, less than about 0.5 weight percent, or even less than about 0.1 weight percent of the solvent, relative to the total weight of the polymer, is lost during prolonged use). In addition, such solvents preferably have a high boiling point (i.e., typically greater than about 100° C.), a low vapor pressure, a high dielectric constant, a low viscosity, low solubility for the polymer electrolyte itself, and are compatible with the components of the electrochemical cell of which the electrolyte is a part. Common solvents for some applications include, for example, water, triflic acid, acetic acid, and phosphoric acid.

In preparation, the concentration of polymer in solution can vary, for example the ratio of the weight of the polymer to the volume of solution ranging from about 1:100 (g:ml) to about 1:10, or from about 1:80 to about 1:20 (e.g, values of about 1:80, 1:60, 1:40, and 1:20). Likewise, the ratio (wt:wt) of cross-linker to polymer in solution can also vary, for example ranging from about 1:20 to about 2:1, or from about 1:15 to about 1:1 (e.g., about 1:15, 1:10, 1:5, 1:1 or more).

It is to be noted that the upper and/or lower limits for polymer concentration in solution can also vary, the ratio being controlled in part in order to control the overall rate of reaction, for example the rate of cross-linking increasing as the concentration of the polymer or cross-linker in solution increases, the solvent thus acting to slow the reaction to some manageable rate. It is to be further noted that the reaction temperature and/or pressure can be changed in order to increase or decrease the rate of the reaction and/or solvent evaporation; likewise, the reaction time may also vary, typically ranging from several minutes (e.g., about 5, 10, 20, 40, 60 or more) to a few hours (e.g., about 2, 5, 10 15, 20 or more) and up to several days (e.g., 2, 4, 6 or more), the reaction time being at least in part a function of (i) the polymer molecular weight, (ii) the degree of polymer branching, (iii) pH, (iv) the concentration of polymer in solution, (v) the ratio of polymer to cross-linker, and/or (vi) the reaction temperature and/or pressure. Finally, it is to be noted that, as further described herein, other, non-cross-linking additives (e.g., plasticizers or external acids, such as $H_3PO_4$) can also be added, typically before the addition of the cross-linker to the polymer solution.

Once prepared, although the final concentration of the protic swelling solvent in the polymer electrolyte will vary, the concentration of the solvent in the electrolyte will, in some embodiments, range from a few weight percent (e.g., about 1, 2, 4, 6, 8, 10 or more weight percent), based on the total weight of the electrolyte, to several tens of weight percent (e.g., about 10, 20, 40, 60, 80 or more). Typically, however, this concentration will be less than about 50 weight percent, less than about 25 weight percent, less than about 10 weight percent, less than about 5 weight percent, or even less than about 1 weight percent, relative to the total weight of the swollen polymer electrolyte.

Additives, which act to increase proton transport or mobility, may optionally be incorporated into the polymer electrolyte during the swelling and/or polymerization process. Generally speaking, essentially any compound which would act as a "proton shuttle," aiding in the movement of protons from one covalent bond in the polymer electrolyte to another, may be employed, provided it is soluble in and compatible with the polymer electrolyte system of interest. Examples of suitable additives for some applications include various amides (e.g., benzamides), amines (e.g., $(CH_3CH_2)_3N$), or ammonium salts having at least one labile proton (e.g., alkyl ammonium salts, such as $(CH_3)_3NH^+$). In this regard it is to be noted that one skilled in the art would recognize that the precise form of, for example, the amine/ammonium salt will depend on the protonation state of the polymer.

The precise concentration of the additive within the polymer system will vary depending upon, for example, the composition of the polymer itself, the particular additive to be used, the generally solubility limit of the additive in the polymer, as well as the protic solvent (if one is to be used). Accordingly, the concentration will therefore be determined with these considerations in mind, in order to optimized the overall proton conductivity of the polymer electrolyte. Typically, however, the concentration of additive within the polymer electrolyte will range from less than about 1 weight percent (e.g., 0.1, 0.2, 0.4, 0.6, 0.8 weight percent), to a few weight percent (e.g., about 2, 4, 6, 8, etc.) or more (e.g., about 10, 15, 20, etc.).

"Single Ion" Electrolytes

It is to be noted that, in one embodiment of the present invention, the polymer electrolyte is prepared such that conductivity is achieved by means of a "single ion" source; that is, conductivity using the polymer electrolyte is achieved by the movement of only the cations or anions in the system, the corresponding counter-ions being part of the polymer itself and thus not being mobile.

Without being held to a particular theory, it is generally believed such a system is a significant improvement over existing "two ion" electrolytes because, when subjected to DC current over time, segregation of positively and negative ions occurs, each type of ion accumulating at the corresponding oppositely charged electrode. This build-up of like-charged ions near each electrode surface results in increased internal resistance, and thus decreased current output at a given potential (i.e., voltage) of a battery comprising such an electrolyte. However, this build-up occurs at both electrodes. As a result, a "single ion" electrolyte does not have this problem because only one type can move.

In this embodiment of the present invention, the electrolyte comprises a polymer having ionic substituents (e.g., $R^1$) attached to the polymer backbone. These substituents may be present in the monomer, from which the polymer is prepared, or alternatively may be attached to the polymer backbone after polymerization has been completed. Essentially any substituent known to one skilled in the art may be employed, including for example alkylsulfate or alkylsulfonate salts (e.g., sodium methyl, ethyl, propyl, etc. salts), as well as aryloxides (e.g., phenoxides, such as lithium phenoxides), alkylcarboxylates and alkylphosphonates.

Electrolyte Properties

Experience to-date suggests that the present polymer electrolytes can be formed into thin, continuous films (i.e., films substantially free of chemical boundaries and ranging in thickness from, for example, about 25 to about 2000, from about 50 to about 1500, or even from about 100 to about 1000 microns). Additionally, these electrolyte films have good specific conductivity (i.e., about $10^{-5}$ S/cm, $10^{-4}$ S/cm, $10^{-3}$ S/cm or greater, as determined by means known in the art, and also as described herein below) at temperatures ranging from about 20° C. to about 100° C. (i.e., about 20° C., 40° C., 60° C., 80° C.).

However, in this regard it is to be noted that, because of the favorable mechanical properties and the ability to maintain conductivity at high salt concentrations (i.e., a high ion flux), the present invention advantageously allows for thin films (i.e., films having low resistivity) to be prepared and used in some lower conductivity embodiments for certain applications, as well.

Additionally, it is to be noted that these films are continuous and homogeneous, being substantially uniform in terms of composition and physical/electrical properties, while also having relatively low densities (in comparison, for example, to prior art materials formed under pressure, as referenced above). Furthermore, as noted herein, these films have been found to possess mechanical properties at common operational temperatures that are superior to, for example, existing poly(ethylene oxide)-based electrolytes, which currently predominate the field of battery technology research.

Applications

Employing means known in the art, the electrolytes of the present invention may be suitably used in a number of different electrochemical cell applications including, for example, batteries and fuel cells. The configuration of such cells is generally described below. However, it is to be understood that the configuration may be other than herein described without departing from the scope of the present invention.

Battery

Generally speaking, the metal salt-containing polymer electrolytes of the present invention may be used to prepare a battery by means common in the art (see, e.g., U.S. Pat. Nos. 5,456,000; 5,460,904; 5,552,239; and, 5,840,087, all of which are incorporated herein by reference). Referring now to FIG. 1, a basic, laminated battery cell structure, which may be prepared using the polymer electrolyte of the present invention, is depicted. The battery cell structure comprises a collector foil, such as copper, 11, typically in the form of open mesh grid, upon which is laid a negative electrode membrane 13, which may comprise an intercalatable material such as carbon or graphite or a low-voltage insertion compound such as $WO_2$, $MoO_2$, or Al, dispersed in a polymeric binder matrix. The polymer electrolyte/separator film of the present invention, 15, is positioned upon the electrode element 13 and is covered with a positive electrode membrane 17, which may comprise a composition of a finely-divided lithium intercalation compound, such as $LiMn_2O_4$, $LiCoO_2$, or $LiNiO_2$, in a polymeric binder matrix. An aluminum collector foil or grid 19 completes the assembly, which is then pressed between, for example, platens (not shown) under heat and pressure to soften and bond the polymeric components and laminate the membrane and grid layers.

Gradient Battery

In addition to being used to prepare an electrolyte for use in, for example, a typically battery cell structure, the polymer of the present invention may be used to prepare a gradient battery, or a battery wherein a single, continuous electrolyte phase extends from one collector to the other. More specifically, the polymer of the present invention may be used to prepare a battery having a single, unitary cell structure (i.e., a battery wherein the anode, electrolyte and cathode are regions within a single, continuous electrolyte phase). Such a battery is advantageous for several reasons, including the fact that the cross-linked polymer act as a continuous matrix or network for the composite anode, separator and composite cathode regions, such that essentially no macro-scale interfaces exist between them. Such a structure is quite unlike conventional batteries, wherein the anode, separator or electrolyte and cathode are individual layers laminated or in some other way bound together, such that large or macro-scale interfaces are present between these separate and distinct entities. A gradient battery is also a significant improvement over, for example, common battery structures wherein the anode and cathode have polymeric binders which differ from the electrolyte material.

As is known to those of skill in the art, the large-scale interfaces which exist in these regions for current, state-of-the-art electrolytic cells is a source of problems relating to the overall conductivity and performance of such cells. More specifically, it is well-recognized that large-scale or bulk interfaces commonly serve as sites where electrical failures occurs. Accordingly, the performance of a gradient battery is improved because the interfaces present are of a significantly smaller scale. Multiple small-scale failures can occur without substantially impacting performance, thus prolonging the useful life of the battery.

Figure 3:
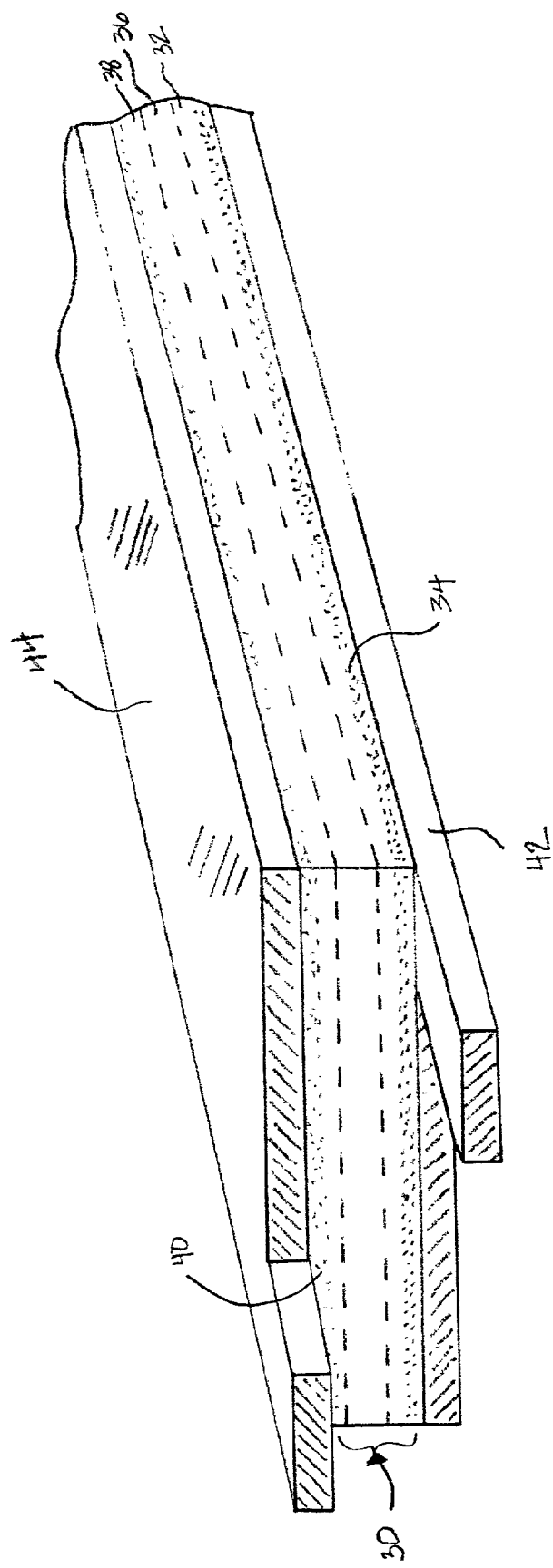
FIG. 3 is a schematic diagram of a battery having a continuous electrolyte phase extending from one collector to the other. (It is to be noted that the dotted or dashed line represents different regions within a single, continuous structure; that is, these lines represent transitions between different regions of a single, unitary structure, rather than large-scale interfaces present between layers of a conventional battery structure.)

Accordingly, the present invention additionally provides the means by which to prepare such a gradient battery. More specifically, referring to FIG. 3, it can be seen that, generally speaking, the gradient battery comprises a continuous, covalently cross-linked polymer film 30. The polymer film comprises labile metal ions or protons (not shown), a negative electrode region 32 in which is initially dispersed an anodic material 34 (e.g., an intercalatable material, such as those described above), an electrolyte region 36 (i.e., the polymer electrolyte of the present invention), and a positive electrode region 38 in which is initially dispersed a cathodic material 40 (e.g., a finely-divided lithium intercalation compound, such as those described above). Additionally, the gradient battery comprises, as in a common battery cell, current collectors 42 and 44, which are in contact with the negative and positive electrode regions of the polymer film. Optionally, intervening regions (not shown) between the negative electrode 32 and the positive electrode 38 may be present which contain appropriate metal ions (e.g., $Cu^{+2}$ salts), in order to facilitate the redox process.

Generally speaking, the gradient battery may be prepared by means known to one skilled in the art. For example, such a battery can be prepared by forming a first solution comprising a polymer of the present invention and a particulate material suitable for use as an anode or cathode. More specifically, a solution comprising a polymer of the present invention, a cross-linking agent and a material (such as those described herein) which is suitable for use as an anode or cathode, preferably in particulate form, are mixed and placed in a vessel suitable for allowing a film to form or cure. A second solution, comprising a polymer electrolyte of the present invention (i.e., a solution comprising a polymer of the present invention, a cross-linking agent and metal ions) is then deposited upon the first film, or more specifically a first regioin of what will be a single, continuous film.

In this regard it is to be noted that because the cross-linking reaction occurs over time, if the second solution is deposited upon the first after the first has taken form or begun to "set up" (i.e., after cross-linking and/or solvent evaporation has reached the point at which film formation has begun) but before the curing or cross-linking process is complete, the two solutions will form separate, distinct regions within a single, continuous film because cross-linking will occur between the solutions. More specifically, as a result of, among other things, the timing of the addition and the rate of the cross-linking reaction, the contents of the solutions (i.e., the electrode material in the first solution and the metal ions in the second) remain substantially confined within separate regions, while polymers within one region that are proximate polymers in another region are bound together as a result of the cross-linking reaction.

Following this same process, a third solution is prepared, having a composition similar to the first, with the exception that the electrode material dispersed in the solution is suitable for use as an anode if the first solution comprised a material suitable for use as a cathode, or vice versa. As when the second solution was deposited upon the first, the third solution is deposited upon the second after the second has taken form, but before the cross-linking process has reached completion. As a result, once the curing process is complete for each of the solutions, a continuous polymer film will result which has distinct regions which act as the anode, the electrolyte/separator, and the cathode. The battery structure can then be completed by the application of current collectors to each side of the polymer film.

It is to be noted that the gradient battery may be prepared by alternative processes without departing from the scope of the present invention. For example, in at least some embodiments, cross-linking is performed for purposes of controlling the diffusion or settling of the metal electrode materials. Therefore, partial cross-linking may be optional, provided the viscosity of the polymer solution is sufficient to prevent settling and/or mixing of these materials before gelation occurs (i.e., before the polymer beings to solidify).

It is to be further noted that the process of preparing a gradient batter can be accelerated, for example, by heating (e.g., to about 50° C., 75° C. or more, depending upon the materials, such as the type of polymer, solvent, etc., employed). Furthermore, multiple mixtures (e.g., another mixture of Zn/branched PEI/dichloroethane cross-linker, and then Cu/branched PEI/dichloroethane cross-linker, etc.) can be used, in order to form compound batteries. Small amounts of a plasticizer can also be added in each mixture, in order to modify the physical properties of the battery.

It is to be still further noted that while the ratio of zinc, copper, etc. can vary in each mixture, generally speaking, the concentration will preferably be above the percolation threshold (i.e., the point at which most of the zinc or copper particles are in physical contact with each other). This threshold depends, at least in part, on the size and the shape of the particles.

Finally, experience to-date suggests, like the polymer electrolytes of the present invention, the gradient battery of the present invention can be formed into very thin, continuous films. Such films can range in thickness, for example, from about 50 microns to about 5000 microns, from about 100 microns to about 4000 microns, or even from about 200 microns to about 2000 microns (excluding the collectors).

The gradient batteries of the present invention possess unique mechanical properties, including for example greater flexibility, elasticity and durability, as compared to conventional batteries.

Fuel Cell

Generally speaking, the protonated polymer electrolytes of the present invention may also be used to prepare a fuel cell by means known in the art (see, e.g., U.S. Pat. Nos. 5,994,426; 6,010,798; and, 5,045,934, all of which are incorporated herein by reference).

Figure 2:
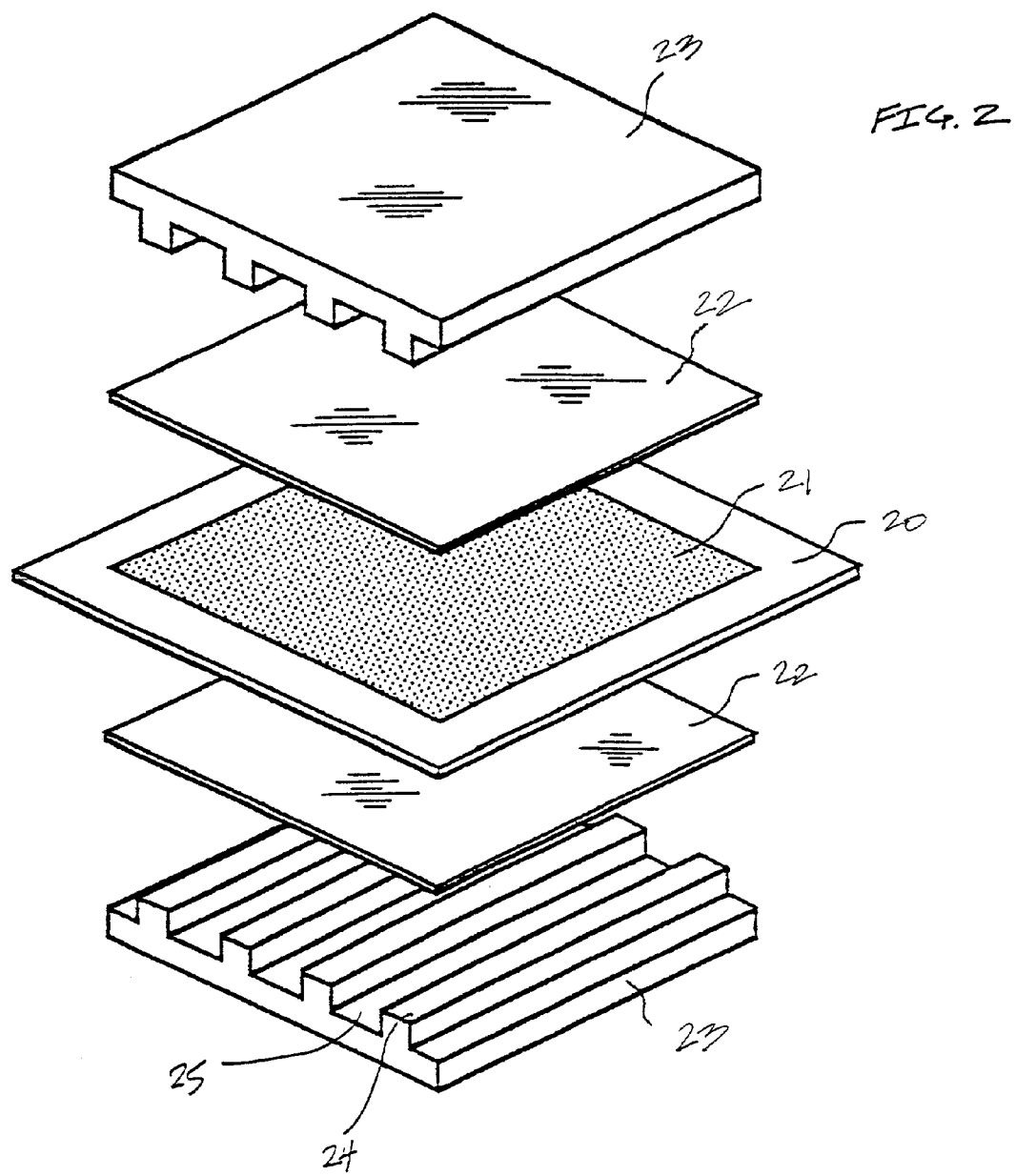
FIG. 2 is an exploded perspective view showing a basic fuel cell structure employing the electrolyte of the present invention; and, FIG. 3 is a schematic diagram of a gradient battery cell structure of the present invention; that is.

Referring now to FIG. 2, the basic structure of a fuel cell, which may be prepared using the polymer electrolyte of the present invention, is depicted. The fuel cell structure comprises the polymer electrolyte membrane of the present invention 20, upon which is deposited on each side a catalyst layer 21, which typically contains a precious metal (such as, for example, platinum), to form a membrane-electrode assembly. Diffusion layers 22 (i.e., gas-permeable, porous, electrically conductive collectors, one acting as the anode and one as the cathode) are disposed on both sides of the membrane-electrode assembly, which act to allow a fuel gas or an oxidizing agent gas to be passed to the catalyst layers 21, while also performing the function of outward delivery of an electric current. These diffusion layers are interposed between gas-impermeable separators 23 to form a cell. Ribs 24 and grooves 25 on the side of the separators facing the diffusion layers are provided, through which either fuel gas or an oxidizing agent gas may flow.

In operation, one side of the fuel cell is supplied with a combustible substance (e.g., gas or liquid), such as hydrogen, a hydrogen-containing gas or an alcohol (e.g., methanol), and the other side is supplied with an oxidant, such as oxygen or an oxygen-containing gas (e.g., air, carbon monoxide or nitrogen oxides ("$NO_x$")). Hydrogen is oxidized at the anode, protons being produced which diffuse through the membrane to the oxygen side; in this case, water is generally entrained with them (the so-called "drag effect"). At the cathode, the protons recombine with reduced oxygen to form water, referred to as product water, which is removed in suitable fashion from the fuel cell.

Performance Tests

Performance tests of the polymer electrolytes of the present invention were conducted by the following methods.

Conductivity

Conductivity of the polymer electrolytes of the present invention was measured by means known in the art. More specifically, polymer electrolyte films for conductivity measurements were formed with thicknesses ranging from about 1000 to about 1800 microns. A disk, about 13 mm in diameter, was cut from each film using a hand punch and placed in a conductivity cell. The film was then placed between two stainless steel electrodes, each with about a 12.5 mm diameter face. (Note that the actual film thickness for each sample was determined by means of a micrometer built into the conductivity cell.)

Conductivity (AC current) was measured using an impendance analyzer (Hewlett Packard, Model 4192A), over a frequency range of about 50 Hz to about 10 MHZ. The potential difference used to measure the conductivity of each sample was typically about 25 mV, although in a few cases the potential difference was about 50 mV. In each case, measurements were taken at about 20° C., 40° C., 60° C. or 80° C., the temperature within the conductivity cell being controlled and measured to within +/−1° C.

Dynamic Mechanical Analysis

Dynamic mechanical analysis was performed by means common in the art to determine the storage modulus of one representative sample of the present invention. More specifically, a sample was prepared and tested as follows:

LPEI (0.91 g; average molecular weight about 86,000) was dissolved in 6 mL methanol, and then 1,6-diiodohexane (0.23 g) was added (N:I ratio about 15.7:1). The solution was thoroughly mixed and allowed to gel in a 50 mm diameter dish for about 1 day. The solvent was then allowed to evaporate. Dynamic mechanical analysis was then performed on the cross-linked sample, indicating that the room temperature storage modulus was about 30,000 psi. This modulus, or stiffness, is similar to that of low density polyethylene.

Solvent Retention

Experience to-date shows, for example, that a cross-linked (using a dihalide cross-linker), linear PEI swollen with N-methylpyrrolidone (about 40 weight percent), did not "bleed" (i.e., lose any significant amount of solvent, based on weight measurements) over a period of several days.

Similarly, a cross-linked (using a bisacetal cross-linker) linear PEI (hydrochloride salt) swollen with a $H_3PO_4$ solution (about 85 weight percent) did not "bleed" over a period of several months (some samples having been found to exhibit little or no bleed after 4, 8, 12 months or more). (See "Experiments" provide below, for additional details.)

Definitions

As used herein, "hydrocarbylene" typically embrace moieties consisting exclusively of the elements carbon and hydrogen and which may optionally be substituted with other hydrocarbyl, halo (e.g., chlorine, fluorine, bromine) or other hetero (e.g., nitrogen, oxygen, sulfur) substituents. These moieties may include alkylene, alkenylene, alkynylene and arylene groups, as well as such groups substituted with other aliphatic or cyclic hydrocarbon groups such as, for example, alkaryl, alkenaryl and alkynaryl.

"Heterohydrocarbylene" embrace moieties in which a carbon chain atom in the corresponding hydrocarbylene moiety has been replaced with a heteroatom, such as nitrogen, oxygen or sulfur (or alternatively a halogen atom).

"Alkylene" groups described herein are preferably lower alkylene, containing from about 1 to about 6 carbon atoms, and more preferably from about 1 to about 3 or 4 carbon atoms, in the principal chain. They may be straight or branched chains and include methylene, ethylene, propylene, isopropylene, butylene, isobutylene, pentylene, hexylene and the like. They may be substituted with aliphatic or cyclic (including aryl) hydrocarbon radicals, halogens or other heteroatoms. Similarly, one or more carbon atoms in the main chain of the substituent or moiety may be replaced with a heteroatom (such as nitrogen, oxygen or sulfur, or alternatively a halogen), which is sometimes referred to herein as a "heterohydrocarbylene" moiety. These too may be optionally substituted as described above and, like the lower alkylene analogs, preferably range from about 1 to about 6 atoms, and more preferably from about 1 to about 3 or 4 atoms, in the principal chain.

As used herein, "hydrocarbyl" typically embraces moieties consisting exclusively of the elements carbon and hydrogen, which may optionally be substituted with other hydrocarbyl, halo (e.g., chlorine, fluorine, bromine) or other hetero (e.g., nitrogen, oxygen, sulfur) substituents. These moieties include alkyl, alkenyl, alkynyl and aryl moieties, as well as alkyl, alkenyl, alkynyl and aryl moieties substituted with other aliphatic or cyclic (including aryl) hydrocarbon groups such as, for example, alkaryl, alkenaryl and alkynaryl. "Heterohydrocarbyl" embrace moieties in which a carbon chain atom is replaced by a heteroatom, such as nitrogen, oxygen, or sulfur, or alternatively a halogen.

"Alkyl" groups described herein are preferably lower alkyl containing from about 1 to about 6 carbon atoms in the principal chain, and more preferably from about 1 to 3 or 4 carbon atoms in the principal chain. They may be straight or branched chains and include methyl, ethyl, propyl, isopropyl, butyl, isobutyl, tertiary butyl, pentyl, hexyl and the like. They may be substituted with an aliphatic or a cyclic hydrocarbon radical, a halogen or other heteroatom.

"Alkenyl" groups described herein are preferably lower alkenyl containing from about 2 to about 6 carbon atoms in the principal chain. They may be straight or branched chains and include ethenyl, propenyl, isopropenyl, butenyl, isobutenyl, pentenyl, hexenyl, and the like. They may be substituted with an aliphatic or cyclic hydrocarbon radical, a halogen or other heteroatom.

"Alkynyl" groups described herein are preferably lower alkynyl containing from about 2 to about 6 carbon atoms in the principal chain. They may be straight or branched chain and include ethynyl, propynyl, butynyl, isobutynyl, pentynyl, hexynyl, and the like. They may be substituted with an aliphatic or cyclic hydrocarbon radical, a halogen or other heteroatom.

As used herein, the phrase "degree of cross-linking," as well as variations thereof, generally refers to the number of cross-linked sites relative to the total number of sites at which cross-linking can occur. This number can be estimated or determined by means known in the art. For example, the total number of sites at which cross-linking can occur can be calculated based on the number of monomer units reacted in the polymerization reaction, multiplied by the number of sites per monomer. The number of sites cross-linked can then be estimated based on the amount of cross-linking agent which reacted with the resulting polymer.

As used herein, "swollen," as well as variations thereof, generally refers to the introduction of a solvent into the polymer matrix, such that it has a larger dimension than it would otherwise have absent the solvent. The solvent may be used to introduce a salt or some other ion, to impart some physical property (e.g., a plasticizing solvent), or both (e.g., a non-volatile acid, like phosphoric acid). However, in some instances, such as in the case of a rigid network, a physical or dimensional change may be limited, due to limited mobility of the network, but a weight change will still typically be observed (due to absorption of the solvent into the void spaces of the network). It will therefore be understood that "swelling" may not in all instances result in a dimensional change.

A "labile proton" typically refers to a proton which is mobile (in terms of conductivity) or removable (in terms of reactivity). The presence of such protons may be determined by means known in the art. "Elastomer" generally refers herein to the ability of the polymer electrolyte to return to its original shape after being deformed under use conditions. In some embodiments, "elastomer" more specifically refers to a polymer electrolyte which, after about a 5% static strain, substantially returns to its original dimensions.

The process of the present invention is further illustrated by the following Examples. These Examples are designed to teach those of ordinary skill in the art how to practice certain features of the present invention. As such, one skilled in the art will recognize that the following procedures could be employed to prepared samples using, for example, (i) different monomers (to prepare different polymers), (ii) different cross-linkers (such as β,β'-dichloroethylether; 1,3-dibromopropane; 1,5-dibromopentane; 1,6-diiodohexane; α,α'-1,2-dibromoxylene; α,α'-1,3-dibromoxylene; α,α'-1,4-dibromoxylene;1,4-dichloro-2-butyne; acrolein, and methylvinylketone), (iii) different salts, (iv) different solvents, (v) different ratios of polymer to cross-linker, polymer to salt, polymer to solvent, etc.

One of skill in the art will further recognize that the following process can be modified in order to identify optimum conditions for a given application. For example, with respect to the determination of cross-linking parameters, one skilled in the art would recognize the described procedure could be employed to for any polymer/solvent/cross-linker/additive combination or system to evaluate, for example, the effects of concentration, cross-linking time and/or temperature.

Accordingly, these Examples are not to be interpreted in a limiting sense.

EXAMPLES

Example 1

Linear Poly(ethylenimine)

A. Preparation of LPEI

Poly(2-ethyloxazoline) (200,000 average molecular weight, commercially available from Aldrich), 34.1 g, was dissolved with stirring and warming in 1800 mL of 3 molar aqueous HCl in a flask fitted with a reflux condenser. The solution was then heated to a gentle reflux for 5 days. The aqueous HCl (and propanoic acid which formed) were removed under reduced pressure using a rotary evaporator. The resulting LPEI hydrochloride salt (which could be used directly for cross-linking in water with a bisacetal, as further described below) was dissolved in 3500 mL distilled water, and then sodium hydroxide pellets were added with heating and stirring until (i) a pH greater than 10, and (ii) a temperature greater than 70° C. were achieved, in order to ensure that the LPEI was dissolved. The solution was allowed to cool to room temperature, and then the resulting solid LPEI was collected by filtration using a glass Buchner funnel, initially by gravity and then by suction.

The resulting solid polymer was purified by placing it in 3500 mL distilled water, heating to dissolve the polymer, and then allowing it to cool to room temperature. The polymer was isolated by filtration (as previously described). This process was repeated until the filtrate had a neutral pH.

The purified polymer was dried under reduced pressure at 45° C. for 1 day, and then 75° C. for 1 day. (11.8 g of LPEI was obtained; about 80% theoretical yield; NMR and IR spectra were in agreement with literature data; see, e.g., R. Tanaka et al., *Macromolecules*, 16, (1983) 849.) The calculated average molecular weight of the resulting LPEI, assuming no significant chain scission, was about 86,000.

B. Preparation of Salt-Containing LPEI Samples

Lithium triflate ("LiTf") and sodium triflate ("NaTf") (both commercially available from Aldrich) were dried under vacuum at 120° C. for 24 hours. Anhydrous methanol (commercially available from Aldrich, 99.8%, 0.002% water) was redistilled and stored over molecular sieves. All materials were stored in a nitrogen-atmosphere glovebox with a moisture of less than 1 ppm. In the glovebox, the desired ratio (as detailed below) of LPEI and LiTf or NaTf were dissolved in vials with anhydrous methanol, capped and then stirred for 24 hours. To obtain films of the samples, the solutions were cast onto glass slides and then methanol was allowed to evaporate at room temperature in the glovebox. The resulting films were then dried under vacuum for 48 hours at 45° C.

The composition of the resulting polymers is generally expressed in terms of the ratio of nitrogen atoms in the polymer to metal cations (i.e., N:M ratio). Polymer electrolytes having a N:M ratio of 4:1, 20:1, 10:1, 5:1 and 3:1 were prepared and used for IR and Raman spectroscopic studies and thermal analysis. (See S. York et al., *Eletrochimica Acta*, 46 (2001) 1533.) Additionally, the conductivity of a number of these samples was measured as further described below.

C. Conductivity Measurements

The ionic conductivities of various samples were determined using impedance spectroscopy, a know method whereby conductivity values are calculated from measurements of the complex impedance of a sample contained in a cell (see, e.g., P. G. Bruce, *Polymer Electrolyte Reviews*, Vol. 1 (J. R. MacCallum and C. A. Vincent eds., Elsevier, Amsterdam, 1987)). In this method, the cell is comprised of blocking electrodes, and the real and imaginary parts of the impedance are measured as a function of the alternating current frequency. For the measurements, stainless steel blocking electrodes were used. The sample geometry was determined from the diameter of the cylindrical surfaces of the blocking electrodes, and the sample thickness as measured by a micrometer. The temperature of the sample was controlled by containing the sealed cell in a constant temperature bath.

The data for the various samples is summarized in the tables provided below (the sample compositions being given in terms of the nitrogen to cation ratio, in this case N:Li):

TABLE 1

| Sample Comp. (N:Li) | Conductivity, S cm$^{-1}$ | | |
| --- | --- | --- | --- |
| Heating Cycle Temp, ° C. | 5:1 | 10:1 | 20:1 |
| 20 |  | 6.9E-08 | 2.2E-09 |
| 30 | 1.7E-07 | 9.1E-08 | 4.8E-09 |
| 40 | 2.2E-07 | 2.6E-07 | 3.0E-08 |
| 50 | 4.4E-07 | 2.2E-06 | 3.3E-07 |
| 60 | 1.3E-06 | 9.5E-06 | 2.6E-06 |
| 70 | 5.2E-06 | 2.4E-05 | 5.2E-05 |

TABLE 2

| Sample Comp. (N:Li) Cooling Cycle Temp, ° C. | Conductivity, S cm$^{-1}$ 10:1 |
| --- | --- |
| 20 | 2.4E-07 |
| 30 | 1.5E-06 |
| 40 | 9.9E-06 |
| 50 | 3.2E-05 |
| 60 | 8.1E-05 |
| 70 | 1.9E-04 |

In addition to the data provided above, a sample with a N:Li ratio of 15:1 was also prepared. The conductivity was measured at 60° C. and found to be $5.5 \times 10^{-6}$ S cm$^{-1}$.

D. Cross-linking (1) General Experiments to Establish Cross-linking

To establish the cross-linking of LPEI in solution, measured amounts of LPEI were placed in glass vials and dissolved in an appropriate amount of absolute methanol. The desired amount of cross-linker was added to each vial, the vials were then capped and the solutions shaken vigorously to ensure homogeneity. The vials were allowed to stand undisturbed at room temperature. Gelation and cross-linking were taken to have occurred when a solution no longer visually exhibited any flow upon tilting at a 90° angle.

(2) General Determination of Cross-linking Parameters

In 1 dram vials was placed 0.10, 0.15, 0.20, 0.25, and 0.30 g LPEI and 1 mL absolute methanol. The vials were capped and the LPEI allowed to dissolve overnight. A measured amount (0.12 g) of 1,6-dibromohexane cross-linker was added to each vial, the vials were capped, shaken thoroughly, and allowed to stand at room temperature until it was observed that the solution no longer flowed when placed on its side (i.e., tilted at a 90° angle).

The time for gelation was taken as the time it took for cross-linking to occur, the respective values obtained were: no gelation after several months (0.10 g LPEI), 168 hours (0.15 g LPEI), 90 hours (0.20 g LPEI), 66 hours (0.25 g LPEI), and 47 hours (0.30 g LPEI).

E. Preparation of Cross-linked LPEI Films (1) Cross-linked LPEI Film

Anhydrous, linear PEI (average molecular weight, about 86,000) (0.90 g) was dissolved in 6 mL absolute methanol. 1,6-Dibromohexane (0.25 g) was added, the mixture was thoroughly mixed and poured into a flat-bottomed 50 mm diameter glass dish, which was covered to stop evaporation. The reaction vessel was allowed to stand at room temperature (about 20–25° C.) for 3 days, after which the vessel was uncovered to allow slow evaporation of the solvent. After evaporation of solvent to a constant volume/thickness, disks of 13 mm diameter and 1.20 mm thickness for conductivity measurements were cut from the resulting membrane/film. The disks were mechanically coherent, free-standing, and flexible enough to be bent at a 90° angle without fracturing. The conductivity of the film as a result of, or after, the cross-linking process was determined to be $6.6 \times 10^{-6}$ and $1.07 \times 10^{-3}$ S/cm at 20° C. and 80° C., respectively.

(2) Preparation of Cross-linked LPEI Films Containing a Salt (a) LiTf

Anhydrous linear PEI (average molecular weight, about 86,000) (0.91 g) was dissolved in 6 mL absolute methanol. Lithium triflate (LiTf, 0.16 g) was dissolved in the solution, and then 1,6-dibromohexane (0.24 g) was added. The mixture was thoroughly mixed and poured into a flat-bottomed 50 mm diameter glass dish which was covered to stop evaporation. The reaction vessel was allowed to stand at room temperature (about 20–25° C.) for 3 days, after which the vessel was uncovered to allow slow evaporation of the solvent. After evaporation of solvent to a constant volume/thickness, disks of 13 mm diameter and 1.30 mm thickness for conductivity measurements were cut from the resulting membrane/film. The disks were mechanically coherent, free-standing, and flexible enough to be bent at a 90° angle without fracturing. The conductivity of the cross-linked film (N:Li ratio of 20:1) as a result of, or after, the cross-linking process was determined to be $2.1 \times 10^{-6}$ and $2.7 \times 10^{-4}$ S/cm at 20° C. and 80° C., respectively.

(b) LiTfSl

The procedure as outlined above was followed using LiTfSl (i.e., lithium bis(triflouromethylsulfonylimide)), to prepare a second, cross-linked film (N:Li ratio of 15:1). The conductivity of the film as a result of, or after, the cross-linking process was determined to be $2.5 \times 10^{-8}$ and $5.4 \times 10^{-5}$ S/cm at 20° C. and 80° C., respectively.

(3) Preparation of Cross-linked LPEI Films Containing a Salt and a "Plasticizing" Solvent Anhydrous linear PEI (average molecular weight, about 86,000) (0.90 g) was dissolved in 6 mL absolute methanol. Lithium triflate (0.16 g) and propylene carbonate (0.45 g) was dissolved in the solution, and then 1,6-dibromohexane (0.26 g) was added. The mixture was thoroughly mixed and poured into a flat-bottomed 50 mm diameter glass dish which was covered to stop evaporation. The reaction vessel was allowed to stand at room temperature (about 20–25° C.) for 3 days, after which the vessel was uncovered to allow slow evaporation of the solvent. After evaporation of solvent to a constant volume/thickness, disks of 13 mm diameter and 1.20 mm thickness for conductivity measurements were cut from the resulting membrane/film. The disks were mechanically coherent, free-standing, and flexible enough to be bent at a 90° angle without fracturing.

The conductivity of the cross-linked, propylene carbonate-plasticized, film (N:Li ratio 20:1) as a result of, or after, the cross-linking process was determined to be $5.2 \times 10^{-7}$ and $1.1 \times 10^{-4}$ S/cm, respectively.

(4) Preparation of Additional Cross-linked LPEI Films

Following the procedure as generally outlined above, additional samples were prepared using various ratios of polymer to cross-linker (expressed as a ratio of nitrogen to halogen, a dihalide cross-linker being used) as indicated in the table provided below, in order to determine if films could be prepared and, if so, to further investigate the general appearance of these films. More specifically, 3 mL aliquots of a 4 M solution of LPEI (average molecular weight about 86,000) in absolute methanol were placed in vials. An amount of cross-linker (as noted below) was added to each vial, and then the contents of the vials were mixed thoroughly. The solutions were then poured into 50 mm diameter dishes. The dishes were sealed to allow the solutions to gel over a period of about 1 day. The dishes where then unsealed and the methanol was allowed to evaporate slowly.

TABLE 3

| Polym. | Amt. | Linker | Amt. | N:Br | Comments on Film |
|---|---|---|---|---|---|
| LPEI | 0.53 g | DBP | 0.13 g | 9.9 | sl. rigid; opaque |
| LPEI | 0.53 g | DBP | 0.25 g | 5 | flexible; sl. frosted |
| LPEI | 0.53 g | DBP | 0.49 g | 2.5 | v. flexible; tacky; clear |
| LPEI | 0.53 g | DBP | 0.8 g | 1.6 | flexible; tacky; v. sl. frosted |
| LPEI | 0.53 g | DBH | 0.12 g | 12.1 | tough; v. flexible; sl. frosted |
| LPEI | 0.53 g | DBH | 0.31 g | 4.8 | flexible; clear |
| LPEI | 0.53 g | DBH | 0.63 g | 2.4 | flexible; clear |
| LPEI | 0.53 g | DBH | 1.01 g | 1.5 | fairly rigid; clear |

(DPB = 1,6-dibromohexane; DBH = 1,3-dibromopropane; v. = very; and, sl. = slightly; N:Br represents the ratio of nitrogen to bromine, bromine being 1 in all cases and being normalized to account for the presence of two bromine atoms in each dihalide cross-linker.)

Overall, the LPEI films were either colorless or had a very slight yellow tinge, and were found to be physically more robust and less tacky than the BPEI counterparts (described below). Generally, flexibility and tackiness were found to decrease, and rigidity increase, with increasing amounts of cross-linker. All films were free-standing, having thicknesses ranging from about 300 to 900 microns. Opacity in the LPEI films when lower amounts of cross-linker were used is consistent with some residual degree of crystallinity of the LPEI segments.

Example 2

Poly(ethylenimine) Hydrochloride

A. Preparation of LPEI Hydrochloride

Poly(2-ethyloxazoline) (200,000 average molecular weight, commercially available from Aldrich), 34.1 g, was dissolved with stirring and warming in 1800 mL of 3 molar aqueous HCl in a flask fitted with a reflux condenser. The solution was then heated to a gentle reflux for 5 days. The aqueous HCl (and propanoic acid which formed) were removed under reduced pressure using a rotary evaporator to obtain the resulting LPEI hydrochloride salt.

B. Cross-linking of LPEI Hydrochloride (1) Cross-linking of LPEI Hydrochloride by 1,1,3,3-Tetramethoxypropane The above hydrochloride salt (0.25 g) was dissolved in 5 mL water and then 1,1,3,3-tetramethoxypropane (or malonaldehyde bis(dimethylacetal)) was added (0.13 g). The mixture was thoroughly mixed and then poured into a 50 mm diameter flat-bottomed glass dish which was covered to stop evaporation. The reaction vessel was allowed to stand at room temperature (about 20–25° C.) for 2 days, after which the vessel was uncovered and the solvent was allowed to slowly evaporate. The resulting membrane/film shrank somewhat upon drying and pulled away from the glass surface to yield a mechanically coherent, free-standing, film that was flexible enough to be bent at a 90° angle without fracturing.

(2) Cross-linking of LPEI Hydrochloride by 1,1,3,3-Tetramethoxypropane with Phosphoric Acid Present The above hydrochloride salt (0.25 g) was dissolved in 5 mL water, and then phosphoric acid (85%, 0.25 g) and 1,1,3,3-tetramethoxypropane (0.25 g) were added. The mixture was thoroughly mixed and then poured into a 50 mm diameter flat-bottomed glass container, which was covered to stop evaporation. The reaction vessel was allowed to stand at room temperature (about 20–25° C.) for 2 days, after which the vessel was uncovered and the water allowed to slowly evaporate. The resulting membrane/film shrank somewhat upon drying and pulled away from the glass surface to yield a mechanically coherent, free-standing, films that was flexible enough to be bent at a 90° angle without fracturing.

When placed on a piece of filter paper, no "bleeding" (as described herein) of phosphoric acid was observed, even after standing for several weeks. The conductivity of the cross-linked, LPEI hydrochloride with phosphoric acid film was determined to be $4.3 \times 10^{-5}$ and $7.1 \times 10^{-4}$ S/cm at 20° C. and 60° C., respectively.

(3) Cross-linking of LPEI Hydrochloride by 1,1,3,3-Tetramethoxypropane with Phosphoric Acid Present Following the procedure as outlined above, another film was made using 0.50 g of phosphoric acid (85%), which gave a film having a room temperature (about 20–25° C.) conductivity of $7.3 \times 10^{-5}$ S/cm. After drying under reduced pressure for 2 days at 50° C., the conductivity of this film at room temperature was found to have changed less than an order of magnitude (to $9.8 \times 10^{-6}$ S/cm).

Example 3

Branched Poly(ethylenimine)

A. Preparation of Cross-linked BPEI

BPEI (average molecular weight about 10,000, commercially available from Aldrich) (0.90 g) was dissolved in 6 mL absolute methanol, and then 1,6-dibromohexane (0.25 g) was added. The mixture was thoroughly mixed and poured into a flat-bottomed 50 mm diameter glass dish, which was covered to stop evaporation. The reaction vessel was allowed to stand at room temperature (about 20–25° C.) for 3 days, after which the vessel was uncovered to allow slow evaporation of the solvent. After evaporation of solvent to a constant volume/thickness, disks of 13 mm diameter and 1.20 mm thickness for conductivity measurements were cut from the resulting membrane/film. The disks were mechanically coherent, free-standing and flexible enough to be bent at a 90° without fracturing.

The conductivity of the film as a result of, or after, the cross-linking process was determined to be $6.6 \times 10^{-6}$ and $1.07 \times 10^{-3}$ S/cm at 20° C. and 80° C., respectively.

B. Preparation of Cross-linked BPEI Film Containing a Lithium Salt

BPEI (1.05 g) was dissolved in 6 mL absolute methanol, to which was then added lithium triflate (0.23 g) and, after dissolution, 1,6-dibromohexane (0.25 g). The mixture was thoroughly mixed and poured into a flat-bottomed 50 mm diameter glass dish which was covered to stop evaporation. The reaction vessel was allowed to stand at room temperature (about 20–25° C.) for 5 days, after which the vessel was uncovered to allow slow evaporation of the solvent. After evaporation of solvent to a constant volume/thickness, disks of 13 mm diameter and 1.45 mm thickness for conductivity measurements were cut from the resulting membrane/film. The disks were mechanically coherent, free-standing and flexible enough to be bent to a 90° angle without fracturing.

The conductivity of the resulting cross-linked BPEI film (N:Li ratio of 17:1) was determined to be $2.3 \times 10^{-7}$ and $1.1 \times 10^{-4}$ S/cm at 20° C. and 80° C., respectively.

C. Preparation of Cross-linked BPEI Film Containing a Lithium Salt

An electrolyte comprising branched PEI and lithium ions was prepared by dissolving 0.21 g anhydrous, branched PEI of a molecular weight ($M_n$) of about 80,000 in about 5 ml of absolute methanol. Lithium triflate (0.04 g) was then dissolved in the PEI solution, followed by the introduction of 0.04 g of 1,6-dibromohexane. The mixture was agitated to ensure thorough mixing and then it was poured into a flat-bottomed 50 mm diameter glass dish, which was covered to stop evaporation. The dish, or reaction vessel, was allowed to stand at ambient temperature (about 20–25° C.) and pressure until a gel formed (about 2 days). The vessel was then uncovered to allow the solvent to evaporate.

The resulting membrane or film shrank somewhat upon drying, the film pulling away from the glass surface. The film was found to be mechanically coherent and free-standing. No purification of the final material was needed.

D. Preparation of a Cross-linked BPEI Disk Containing a Lithium Salt and a Plasticizing Solvent LiTf (5 mg) was dissolved in 0.10 g N-methylpyrrolidone in a small, 16 mm diameter polyethylene cup. BPEI (0.11 g) was added to the cup and the mixture was stirred until homogeneous. 1,2-Dichloroethane (0.05 g) was added, and then the mixture was thoroughly mixed. The polyethylene cup was then sealed to retard evaporation of the 1,2-dichloroethane. The reaction vessel was allowed to stand at room temperature (about 20–25° C.) for 5 minutes, after which it was placed in a 70° C. oven for 1 hour. The resulting 0.6 mm thick, freestanding disk was carefully removed from the cup.

The conductivity of the resulting cross-linked BPEI film (N:Li ratio of 80:1), with NMP plasticizer, was determined to be $5.8 \times 10^{-5}$ and $6.9 \times 10^{-4}$ S/cm at 20° C. and 60° C., respectively.

E. Preparation of Additional Cross-linked LPEI Films

Following the procedure as generally outlined above, additional samples were prepared using various ratios of polymer to cross-linker (expressed as a ratio of nitrogen to halogen, a dihalide cross-linker being used) as indicated in the table provided below, in order to determine if films could be prepared and, if so, to further investigate the general appearance of these films. More specifically, 3 mL aliquots of a 4 M solution of BPEI (average molecular weight about 10,000 from Aldrich) in absolute methanol were placed in vials. An amount of cross-linker (as noted below) was added to each vial, and then the contents of the vials were mixed thoroughly. The solutions were then poured into 50 mm diameter dishes. The dishes were sealed to allow the solutions to gel over a period of about 1 day. The dishes where then unsealed and the methanol was allowed to evaporate slowly.

TABLE 4

| Polym. | Amt. | Linker | Amt. | N:Br | Comments on Film |
|---|---|---|---|---|---|
| BPEI | 0.52 g | DBH | 0.76 g | 19.4 | v. flexible/tacky; clear; lt. yell. |
| BPEI | 0.52 g | DBH | 0.15 g | 9.8 | flexible; sl. tacky; clear; lt. yell. |
| BPEI | 0.52 g | DBH | 0.3 g | 4.9 | sl. flexible/tacky; clear; lt. yell. |
| BPEI | 0.52 g | DBH | 0.5 g | 2.9 | fairly rigid; clear; lt. yell. |
| BPEI | 0.52 g | DBP | 0.15 g | 8.3 | v. flexible/tacky; clear; lt. yell. |
| BPEI | 0.52 g | DBP | 0.26 g | 4.7 | flexible; sl. tacky; clear; lt. yell. |
| BPEI | 0.52 g | DBP | 0.46 g | 2.6 | sl. flexible/tacky; clear; lt. yell. |
| BPEI | 0.52 g | DBP | 0.8 g | 1.5 | sl. rigid; clear; lt. yell. |
| BPEI | 0.52 g | DBH | 0.11 g | 13.2 | v. flexible/tacky; clear; lt. yell. |
| BPEI | 0.52 g | DBH | 0.31 g | 4.7 | flexible; sl. tacky; clear; lt. yell. |
| BPEI | 0.52 g | DBH | 0.6 g | 2.5 | sl. flexible/tacky; clear; lt. yell. |
| BPEI | 0.52 g | DBH | 0.97 g | 1.5 | fairly rigid; clear; lt. yell. |

(DPB = 1,6-dibromohexane; DBH = 1,3-dibromopropane; v. = very; sl. = slightly; and, lt. yell. = light yellow. N:Br represents the ratio of nitrogen to bromine, bromine being 1 in all cases and being normalized to account for the presence of two bromine atoms in each dihalide cross-linker.)

The BPEI films were clear and had a variable light yellow color, some deeper or darker than others, while some were almost colorless. The BPEI films were found to be physically less robust and more tacky than the LPEI counterparts (described above). Generally, flexibility and tackiness were found to decrease, and rigidity increase, with increasing amounts of cross-linker. All films were free-standing, having thicknesses ranging from about 300 to 900 microns.

Example 4

Modified Linear Poly(ethylenimine)

A. Linear Poly(N-methylethylenimine) (LPMEI)

LPEI (5.02 g) was dissolved in 50 mL distilled water in a round-bottom flask. Once dissolved, formic acid (88%, 200 mL) and formalin (37%, 125 mL) were added to the solution. The flask was fitted with a reflux condenser, and then the solution was heated to reflux the solvent for 24 hours, after which the solution was allowed to cool. Concentrated HCl (150 mL) was then added. Solvent was removed under reduced pressure to provide the quaternary ammonium hydrochloride salt. The salt was dissolved in distilled water (200 mL) and then NaOH (82 g) was added. The mixture was cooled to about 0° C. A solid polymer/salt complex separated from the remaining solution and was isolated by decanting the liquid from it. The polymer/salt complex was then dissolved in benzene and centrifuged. The polymer solution was decanted from the separated salt and solvent was removed from the supernatant under reduced pressure.

NMR and IR spectral data for the resulting viscous polymer (43% theoretical yield) were in agreement with literature values. (See, e.g., R. Tanaka et al., *Macromolecules*, 16 (1983) 849.)

Samples films of PMEI/LiTf (having N:M ratios of 40:1, 20:1, 10:1, and 5:1) were cast from methanol for IR spectroscopic analyses.

A small sample of cross-linked PMEI was also prepared by dissolved 0.20 g PMEI 1 mL of absolute methanol in a 1-dram vial. 1,6-Dibromohexane (0.068 g) was added and then the vial was capped, shaken thoroughly, and allowed to stand at room temperature until it was observed that the solution no longer flowed when placed on its side (i.e., turned at a 90° angle). The sample had gelled after four days.

B. Branched Poly(N-methylethylenimine) (BPMEI)

BPEI (1.78 g) was dissolved in 10 mL distilled water in a round-bottom flask. Once dissolved, formic acid (88%, 30 mL) and formalin (37%, 30 mL) were added to the solution. The flask was fitted with a reflux condenser and the solution was heated to reflux the solvent for 24 hours, after which the allowed to cool and then 20 mL of concentrated HCl were added. Solvent was removed under reduced pressure to provide the quaternary ammonium hydrochloride salt.

The salt was dissolved in a minimal amount of distilled water and run through a Dowex-1 ion exchange resin column to deprotonate the hydrochloride salt and form BPMEI. The ion exchange resin had been converted to the hydroxide form by treatment with aqueous NaOH, followed by washing thoroughly with distilled water. The capacity of the ion exchange column was more than twice the calculated amount needed to neutralize the BPMEI hydrochloride. The column was washed twice with distilled water to remove al BPMEI and the water was removed from the combined aqueous eluents under reduced pressure to give 2.08 g (88% theoretical yield) BPMEI as a very viscous, amber-colored liquid. NMR: $^1$H(CD$_3$OD) δ(ppm) 2.7–2.4 (4H, complex br), 2.3–2.2 (3H, br) (the BPEI starting material showed only a complex, broad signal from δ 2.7–2.4). FTIR (thin film on NaCl window) showed a disappearance of BPEI NH absorbances at ca. 3350–3150 cm$^{-1}$.

A small sample of BPMEI (0.31 g) was dissolved in 1 mL of absolute methanol in a 1-dram vial. 1,6-Dibromohexane (0.14 g) was added, the vial was capped, shaken thoroughly, and allowed to stand at room temperature until it was observed that the solution no longer flowed when placed on its side. The sample had gelled after several days.

C. Linear Poly(N-2-(2-methoxyethoxy)ethyl)ethylenimine) ("LPMOEOEEI")

(1) Preparation

LPEI (1.22 g) was cut into small pieces and placed in a three-neck 250 mL round-bottom flask. 2-(2-Methoxyethoxy)acetic acid (55.0 mL) was poured into the reaction flask. The mixture was heated until all the LPEI dissolved. The solution was cooled to 5° C. and NaBH$_4$ (about 5 g) was added in the form of small pellets. The thick solution was stirred to insure homogeneity. A reflux condenser was attached to the flask and then the mixture was heated with a 55° C. oil bath for 5 days. The solution was cooled to room temperature (about 20–25° C.) and 50 mL of distilled water was added. NaOH pellets were added with stirring until the pH of the solution was greater than 10. The solution was extracted with $CH_2Cl_2$ (5×25 mL). Centrifugation was used to separate the organic layer from the aqueous layer and the organic layers were combined. The organic layer was dried over $Na_2SO_4$, filtered and the solvent was removed under reduced pressure.

The resulting viscous polymer (94% theoretical yield) was characterized by NMR and FTIR. NMR: $^1H$ (Benzene-$d_6$) δ(ppm) 3.8–3.4 (6H, br), 3.4–3.0 (3H, br), 3.0–2.50 (6H, br). FTIR (thin film on NaCl window) showed a disappearance of LPEI NH absorbances at about 3350–3150 $cm^{-1}$, appearance of a characteristic C—O absorption at about 851 $cm^{-1}$, and no residual absorbances due to carboxylic acid groups.

A sample film of PMOEOEEI/LiTf (N:M ratio of 5:1) was cast from methanol for IR spectroscopic analyses.

(2) Cross-linking

A sample of LPMOEOEEI (0.52 g) was dissolved in 1 mL methanol in a vial. 1,6-Dibromohexane (0.09 g) was added (about N:Br ratio of 5:1), the solution was thoroughly mixed, the vial capped, and then the solution was allowed to stand at room temperature. After 5 days, the solution had not gelled. The vial was therefore uncapped and the solvent allowed to slowly evaporate. After several more days, after sufficient solvent evaporation, the sample did gel (concentration unknown), to give a flexible, clear, reddish, rubbery solid.

D. Linear Poly(N-(2-cyanoethyl)ethylenimine) (PCEEI)

LPEI (0.50 g) was dissolved with stirring in 20 mL absolute methanol in a round-bottom flask. Acrylonitrile (0.86 g) was added to the solution, and then the flask fitted with a reflux condenser. The solution was heated to reflux for 1.5 hours. The solvent was removed under reduced pressure to give a 94% theoretical yield of a viscous, liquid polymer. NMR: $^1H(CDCl_3)$ δ (ppm) 2.92–2.60 (2H, br m), 2.79–2.60 (4H, br m), 2.59–2.45 (2H, br m). FTIR (thin film on NaCl window) showed a disappearance of LPEI NH absorbances at ca. 3350–3150 $cm^{-1}$, appearance of a CN absorbance at 2245 $cm^{-1}$, and no residual absorbances due to vinyl groups.

Samples films of PCEEI/LiTf (N:M ratios of 80:1, 50:1, 30:1, 14:1, 10:1, 8:1 and 4:1) were cast from acetonitrile for IR spectroscopic analyses.

Cross-linking was investigated by first preparing a stock solution of PCEEI in chloroform (PCEEI (0.713 g) dissolved in 1.9 mL of chloroform). Three vials were then charged with 0.5 mL of this stock solution and then 51, 103, and 343 mg of 1,6-dibromohexane were added, respectively, to each. The vials were capped, shaken thoroughly, and then allowed to stand at room temperature until it was observed that the solution no longer flowed when placed on its side (i.e., turned at a 90° angle). The time for gelling was taken as the time for cross-linking to occur: gelation occurred after 72, 42, and 18 hours, respectively. The last of these underwent a phase separation into two layers before gelling.

E. Modification of LPEI with N-(propyl-3-sulfonic Acid) Side-Chains (PPSEI)

(1) Preparation

LPEI (0.20 g) was dissolved with stirring in 20 mL absolute methanol in a round-bottom flask. 1,3-Propanesultone (0.145 g) was added to the solution, the flask fitted with a reflux condenser, and then the solution was heated to reflux for 5 hours. The solvent was removed under reduced pressure to give 95% theoretical yield of a tacky solid polymer.

NMR: $^1H$ ($D_2O$) δ (ppm) 2.83–2.64 (br), 2.63–2.50 (br), 1.82–1.70 (br m). Integration of the distinctive broad multiplet at δ 1.82–1.70 (internal methylene of the side chains) and comparison to the total integration of the other polymer peaks afforded an estimation of the degree of N substitution to be about 25%.

A PPSEI sample in $D_2O$ was neutralized with lithium hydroxide to show the lithium salt of PPSEI could be formed. NMR: $^1H$ ($D_2O$) δ (ppm) 3.32–3.21 (br t), 2.74–2.66 (br t), 2.60–2.40 (br), 1.88–1.64 (br m).

(2) Cross-linking

A sample of LPEI (about 21 mg) modified with about 20% N-(propyl-3-sulfonic acid) side-chains (PPSEI) was dissolved in 0.33 mL methanol in a vial. 1,6-Dibromohexane (47 mg) was added (N:Br ratio of about 1:1), the solution was thoroughly mixed, the vial capped, and then the solution was allowed to stand at room temperature. After 4 days, the solution had gelled.

Example 5

Cross-linked Poly(allylamine) Hydrochloride

A. Cross-linking

Two vials were charged with 3 mL distilled water each, and then 0.29 g and 0.57 g, respectively, of poly(allylamine) hydrochloride (commercially available from Polysciences, molecular weight about 60,000). The polymer was allowed to dissolve and then 1,1,3,3-tetramethoxypropane was added (0.43 g and 0.51 g, respectively). The vials were then capped, shaken thoroughly, and allowed to stand at room temperature (about 20–25° C.) until it was observed that the solution no longer flowed when placed on its side (i.e., turned at a 90° angle). The samples we observed to have gelled after 3 days and 1 day, respectively.

B. Cross-linked Films

Two cross-linked films were made by first dissolving 0.20 g of poly(allylamine) hydrochloride in 6 mL distilled water. Two vials were then charged (3 mL each) with the solution, followed by the addition of 1,1,3,3-tetramethoxypropane (9 mg and 33 mg, respectively). The mixtures were thoroughly mixed and poured into flat-bottomed 50 mm diameter glass dishes, which were covered to stop evaporation. The reaction vessels were allowed to stand at room temperature (about 20–25° C.) for 1 day, after which the vessels were uncovered to allow slow evaporation of the solvent. After evaporation of solvent to a constant volume/thickness, coherent, free-standing films of about 0.35 and 0.45 mm thickness, respectively, were able to be removed. The films were found to be sensitive to moisture, becoming hard and brittle under anhydrous conditions but becoming flexible after a few minutes exposure to moisture in the air.

Example 6

Swelling of Cross-linked LPEI

A. Swelling with Organic "Plasticizing" Solvents A sample of an LPEI film cross-linked with 1,6-dibromohexane (N:Br ratio of 10:1) was cut into three small, rectangular pieces weighing about 17.1 mg, 20.1 mg, and 24.8 mg, respectively. The pieces were then submerged in propylene carbonate (PC), dimethylsulfoxide (DMSO), and N-methylpyrrolidone (NMP), respectively. The pieces were periodically taken out of the solvent, blotted dry, and weighed. After four days, the samples weighed 19.7 mg, 71.4 mg, and 41.2 mg, respectively, and the DMSO sample having been found to have reached an approximately constant weight.

These results represents a weight % uptake of about 15% PC, 255% DMSO, and 66% NMP after 4 days, indicating the polymers clearly took-up or absorbed each of the respectively solvents, the DMSO being absorbed relatively rapidly and the PC relatively slowly.

B. Use of Swelling to Incorporate Salts (1) LPEI Film

A sample of an LPEI film, cross-linked with 1,6-dibromohexane (N:Br ratio of 10:1), was neutralized by swelling in a 2.5 M aqueous NaOH solution. The film was soaked two times in distilled water to remove any excess NaOH, then methanol, and then the sample was allowed to dry to constant weight.

A 12.3 mg piece of this film was swelled again in methanol, followed by swelling in a solution of LiTf in methanol (30 mg/mL). After about 4 hours, the sample was removed from the solution, blotted dry, and allowed to dry to a constant weight (18.7 mg). A 52 weight % uptake of LiTf was observed, representing about a 6:1 N:Li ratio.

(2) LPEI Hydrochloride Film

A sample of an LPEI hydrochloride film, cross-linked with 50 weight percent 1,1,3,3-tetramethoxypropane, was swelled in distilled water. About a 2 cm$^2$ piece of the film was then placed in a very pale blue-green solution of $CuCl_2$ in water overnight. The film observed to have turned very dark blue, signaling significant uptake of $Cu^{2+}$ ions by the film and coordination to the nitrogen atoms.

Example 7

PEI-Based Battery Preparations

A. Primary Batteries (1) Sample 1

A membrane/film, made from LPEI hydrochloride and cross-linked with 1,1,3,3-tetramethoxypropane, was swollen by placing it in 85% phosphoric acid until equilibrium had been reached. The film (about 7×12 mm rectangle, thickness less than 1 mm) was then blotted dry, placed on a 15×10 mm piece of copper foil, and covered with a piece of 6×11 mm zinc foil. The edges were sealed using Scotch tape.

The battery showed a potential of about 0.8 V and a current output of 10–15 μA. After several weeks, the device exhibited a potential of about 0.6 V and a current output of 2–5 μA.

It was observed that the voltage could be increased proportionately by stacking several such batteries. The exact chemical basis (half-cell reactions) of this exemplary type of battery was not determined.

(2) Sample 2

A solution of 0.25 g LPEI hydrochloride and 0.13 g 1,1,3,3-tetramethoxypropane in 3 mL distilled water was spread on a 4×6 cm piece of thin (about 60 micron) Cu foil and allowed to stand overnight so that cross-linking and drying could occur. A 4×6 cm piece of thin (about 30 micron) Sn foil was then carefully place on the slightly tacky polymer layer and gently pressed to ensure contact. The resulting film was then cut into about 1×1 cm squares (about 300 microns thick) with a sharp scissors.

These thin batteries showed a potential of about 0.55 V and a current output of about 10 μA. It was observed that the voltage could be increased proportionately by stacking several of such batteries. (Ten to twelve of these were stacked to give a potential of greater than 3 V, which was found to be sufficient to power a small speaker and microcircuit, such as that used in a greeting card to play a song.) After several months, the devices was found to still exhibit potentials of about 0.2–0.4 V. The exact chemical basis (half-cell reactions) of this exemplary type of battery was not determined.

(3) Sample 3 (Lithium/Graphite)

A small polyethylene cup (about 17 mm diameter) was charged with 0.50 g BPEI, 0.25 g N-methylpyrrolidone, and 0.10 g LiTf. The mixture was thoroughly mixed using a spatula. Graphite powder (0.25 g) was added, the contents were thoroughly mixed, and then 1,2-dichloroethane (0.25 g) was added, the contents again being thoroughly mixed after this addition. The cup was sealed and allowed to stand at room temperature for 10 minutes to allow the graphite to partially settle, and then it was heated in a 70° C. oven for about 30 minutes.

A second small vessel was charged with 0.25 g BPEI, 0.13 g N-methylpyrrolidone, and 0.05 g LiTf. The mixture was thoroughly mixed using a spatula. 1,2-Dichloroethane (0.13 g) was added, the contents were thoroughly mixed, and then this mixture was poured on top of the graphite layer previously prepared. The cup was again sealed and then heated in a 70° C. oven for about 60 minutes. The sample was allowed to cool, yielding a solid disk.

The edges of the disk were trimmed and then it was cut to give a rectangle (about 1.5×0.8×0.5 cm). A cross-section showed the graphite layer was about 0.35 cm thick, and the separator layer about 0.15 cm thick.

In a dry box, the rectangular sample was placed with its graphite face against the center of a 3.5×12.5 mm piece of copper foil. A piece of 0.75 mm thick lithium ribbon was scraped with a razor blade to expose fresh, shiny metal surfaces, and then about a 1.5×0.8 cm of the lithium ribbon was cut off and placed on top of the electrolyte layer of the sample. The sample was covered with a piece of copper foil (about 1.8×1 cm), and then the edges from the top copper foil to the bottom copper foil were sealed using Scotch tape, in order to provide stability and slow any exposure to moisture in the air. The sample was otherwise stored in the dry box.

Under moderate contact pressure, the battery showed a steady potential of 2.5 V and a current output of 10–15 μA. It also was used to easily power a small, hand-held calculator and produce audible levels of sound from a small speaker, even after about 1 week (the current output decreasing somewhat, to about 0.9 μA).

B. Gradient Batteries (1) Primary Zn/Cu (a) Sample 1

Granular zinc (1.5 g, 40 mesh) was mixed with 0.4 g of a 1:1 BPEI/1,2-dichloroethane solution in a small (about 15 mm diameter) polyethylene cup, such that when the Zn settled the Zn layer was about 3 mm thick and the clear layer above was about 2 mm thick. The cup was sealed and the mixture was allowed to set-up or gel overnight. A very thick slurry of spherical Cu powder (2.0 g, 200 mesh Copper in 0.2 g of a 1:1 BPEI/1,2-dichloroethane solution) was added onto the sample to a depth of about 3 mm, and then the sample was sealed and allowed to stand overnight to allow the cross-linking reaction to occur.

The resulting battery was found to be a very tough, single piece pellet, which had a potential of 0.4 V and a current of 100 nA to 1 μA (the potential and current varying with the quality of the contact).

(b) Sample 2

The process as previously described was repeated, with the exception that the cross-linking reactions were accelerated by heating the sample a 70° C. oven for 10 minutes (after the first slurry as placed in the cup, and again after the second slurry was added to the cup). The resulting sample was found to have a potential of up to 0.8 V and a current of 1 to 5 µA (the potential and currently varying with the quality of the contact).

(c) Sample 3

Following the general procedure outlined for Sample 2, above, a third Cu/Zn sample was made in a small (about 15 mm diameter) polyethylene cup using 1:1 BPEI/N-methylpyrrolidone ("NMP") and 1,3-dibromopropane as the cross-linker. To the cup was added a first layer comprising Zn in a 1:1 BPEI/NMP solution (about 3 drops, or 2 mm in thickness), followed after about 10 minutes by the addition of a solution of only BPEI/NMP (about 3 drops, or 1 mm in thickness), and then about 10 minutes after that by the addition of Cu in a 1:1 BPEI/NMP solution (about 3 drops, or 2 mm in thickness). After allowing the cross-linking reaction to be completed, a battery was obtained that was found to be not very robust, but was found to be a single piece pellet with a potential of 0.8 V and a current of 20 µA to 50 µA (the potential and currently varying with the quality of the contact).

(2) Secondary (Rechargeable) Lithium Ion "Rocking-chair" Battery

A stock electrolyte solution of LiTf (0.41 g), N-methylpyrrolidone (0.41 g), and methanol (0.10 g) was prepared in a small test tube. A small vessel was charged with 0.32 g BPEI, 0.31 g lithium manganese oxide spinel (Kerr-McGee, $Li_xMn_2O_y$, where x is about 1 and y is about 4), and 0.26 g of the electrolyte stock solution and the mixture was thoroughly mixed using a spatula. 1,2-Dichloroethane (0.15 g) was added, the contents were thoroughly mixed, and then 0.62 g of the mixture were transferred to a small polyethylene cup. The cup was sealed and heated in a 70° C. oven for about 18 minutes.

A small vessel was then charged with 0.18 g BPEI, 0.10 g of the electrolyte stock solution and 1,2-Dichloroethane (0.13 g) were added, the contents were thoroughly mixed, and then 0.22 g of the mixture were poured on top of the spinel layer. The cup was sealed and heated in a 70° C. oven for about 10 minutes.

A small vessel was then charged with 0.40 g BPEI, 0.31 g graphite (a mixture of about 95% Alfa C graphite and 5% KS6 carbon black), and 0.25 g of the electrolyte stock solution, and then the mixture was thoroughly mixed using a spatula. 1,2-Dichloroethane (0.26 g) was added, the contents were thoroughly mixed, and then 0.61 g of the mixture were poured on top of the electrolyte layer. The cup was sealed and heated in a 70° C. oven for about 30 minutes. The sample was allowed to cool, and the battery disk was removed from the polyethylene cup to give a solid disk. The edges were trimmed and the disk was cut to give a rectangle about 2.5×10×9 mm.

A small vessel was charged with 0.30 g LiTf, 0.30 g N-methylpyrrolidone, and 0.07 g methanol. The mixture was thoroughly mixed to dissolve the salt, and then this solution was added to 0.80 g BPEI in a small polyethylene cup. The mixture was thoroughly mixed. 1,2-Dichloroethane (0.54 g) was added, the contents were thoroughly mixed and the cup was sealed and heated in a 70° C. oven for about 60 minutes. The sample was allowed to cool, and the battery disk was removed from the polyethylene cup to give a solid disk. The edges were trimmed and the disk was cut to give a rectangle about 3×10×8 mm.

The spinel/electrolyte/graphite sample was placed between two stainless steel electrodes, under moderate pressure to ensure good contact. The spinel side electrode was connected to the positive pole of a Lake Shore Cryotronics 120 constant current source, and the graphite side was connected to the negative pole. The sample was charged at a current of 300 µA for 2.5 hours, and its discharge was monitored using a Kiethley 485 Autoranging Picoammeter over several hours. The sample was charged/discharged at a current of 100 µA, and finally at a current of 30 µA.

The cross-linked BPEI/electrolyte sample was treated similarly. It was clear that this sample charged much more quickly and discharged much more quickly.

Each sample was charged at a current of 30 µA for 30 minutes. The samples were allowed to rest for 5 minutes, and then the discharge was monitored continuously using the picoammeter. The cross-linked BPEI/electrolyte sample discharged very quickly, from about 5 µA to 0.5 µA after 5 minutes, reflecting the electrolytic capacitance of the sample. In contrast, the spinel/electrolyte/graphite sample discharged from about 9 µA to 5 µA after 5 minutes, and 3.3 µA after 30 minutes, reflecting the combined, and much greater (about 10×), electrolytic and chemical capacitance of the device, thus demonstrating chemical battery behavior.

Finally, after about 1 week, after having been stored under ambient conditions, the cross-linked BPEI/electrolyte sample was tested again. It was found to have a voltage in excess of about 1 volt, with a current output of about 2 µA. It was found that this sample could be easily recharged to a voltage in excess of 2 volts, with a current output of about 10 µA (which was found to be sufficient to power a common handheld calculator).

In view of the above, it will be seen that the several features of the invention are achieved. As various changes could be made in the above material and processes without departing from the scope of the invention, it is intended that all matter contained in the above description be interpreted as illustrative and not in a limiting sense.

What is claimed is:

1. A covalently cross-linked polymer electrolyte, the polymer electrolyte comprising a polymer backbone containing a linear or branched, substituted or unsubstituted poly(alkylamine), a cross-linker, and a dissolved or dispersed metal salt therein, the cross-linked polymer electrolyte being inert to lithium metal.

2. The polymer electrolyte of claim 1 wherein said electrolyte is a continuous film, having a thickness ranging from about 50 to about 1500 microns.

3. The polymer electrolyte of claim 2 wherein said electrolyte has a specific conductivity of at least about $10^{-4}$ S/cm at a temperature ranging from about 40° C. to about 60° C.

4. The polymer electrolyte of claim 1 wherein said electrolyte has a specific conductivity of at least about $10^{-4}$ S/cm at a temperature ranging from about 40° C. to about 60° C.

5. The polymer electrolyte of claim 1 wherein the polymer is branched.

6. The polymer electrolyte of claim 1 wherein the polymer is linear.

7. The polymer electrolyte of claim 1 wherein the polymer is selected from substituted or unsubstituted poly(ethylenimine) and substituted or unsubstituted poly(propylenimine).

8. The polymer electrolyte of claim 7 wherein the polymer is branched poly(ethylenimine).

9. The polymer electrolyte of claim 1 wherein the polymer backbone comprises a repeat unit represented by the formula:

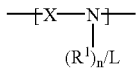

wherein: N is nitrogen, which is attached to a substituent, $R^1$, or a covalent cross-linker, L; $R^1$ a substituent free of covalent bonds to the polymer backbone, other than the backbone containing the nitrogen atom to which it is covalently bound, and is independently selected from the group consisting of hydrogen, substituted or unsubstituted hydrocarbyl, and substituted or unsubstituted heterohydrocarbyl; L is a covalent cross-linker connecting N to another polymer chain; X is the remaining portion of the repeat unit and is independently selected from the group consisting of substituted or unsubstituted hydrocarbylene, and substituted or unsubstituted heterohydrocarbylene; and, n is 1 or 2.

10. The polymer electrolyte of claim 9 wherein said polymer is a copolymer.

11. The polymer electrolyte of claim 10 wherein said copolymer has a backbone comprising two or more different repeat units as defined in claim 9.

12. The polymer electrolyte of claim 11 wherein X is independently selected from methylene, ethylene, propylene, butylene and pentylene.

13. The polymer electrolyte of claim 12 wherein X is ethylene and propylene, the electrolyte being a copolymer of substituted or unsubstituted, branched or linear poly(ethylenimine) and poly(propylenimine).

14. The polymer electrolyte of claim 13, wherein said copolymer is a random copolymer.

15. The polymer electrolyte of claim 9, wherein the polymer is a copolymer, the copolymer backbone comprising repeat units represented by the formulas:

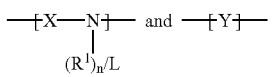

wherein X, N, $R^1$, n and L are as defined in claim 9, and Y is independently selected from the group consisting of substituted or unsubstituted hydrocarbylene, and substituted or unsubstituted heterohydrocarbylene.

16. The polymer electrolyte of claim 15, wherein said copolymer is a random or block copolymer.

17. The polymer electrolyte of claim 16, wherein Y is selected from substituted or unsubstituted polyethylene, polypropylene, poly(ethylene oxide), poly(propylene oxide), poly(ethylene sulfide), and poly(propylene sulfide).

18. The polymer electrolyte of claim 1, wherein the polymer is swollen with a solvent.

19. The swollen polymer electrolyte of claim 18 wherein the solvent concentration in the electrolyte is less than about 50 weight percent, relative to the total weight of the electrolyte.

20. The swollen polymer electrolyte of claim 18 wherein the solvent concentration in the electrolyte is less than about 25 weight percent, relative to the total weight of the electrolyte.

21. The swollen polymer electrolyte of claim 18 wherein the solvent concentration in the electrolyte is less than about 10 weight percent, relative to the total weight of the electrolyte.

22. The swollen polymer electrolyte of claim 18 wherein the swelling solvent is selected from the group consisting of 1,2-dimethoxyethane, methyl formate, dimethylsulfoxide, sulfolane, methyl pyrrolidine, dimethyl formamide, dimethyl acetamide, glymes, nitriles, organic phosphates, organic phosphoramides, carbonates, as well as mixtures thereof.

23. The swollen polymer electrolyte of claim 22 wherein the swelling solvent is a glyme selected from the group consisting of monoglyme, diglyme, triglyme, tetraglyme, or a mixture thereof.

24. The swollen polymer electrolyte of claim 18 wherein the swelling solvent is a plasticizer.

25. The swollen polymer electrolyte of claim 24 wherein the plasticizing solvent is selected from the group consisting of esters, diesters, carbonates, phosphates, acrylates, borates, sulfolanes, sulphates and glymes.

26. The swollen polymer electrolyte of claim 25 wherein the plasticizing solvent is 2-(2-ethoxyethoxy)ethyl acetate.

27. The swollen polymer electrolyte of claim 25 wherein the plasticizing solvent is dimethyl adipate or dibutyl phthalate.

28. The swollen polymer electrolyte of claim 25 wherein the plasticizing solvent is propylene carbonate.

29. The polymer electrolyte of claim 1, wherein the polymer is an elastomer.

30. The polymer electrolyte of claim 1 wherein a nitrogen of one or more amine groups in a first polymer backbone are covalently cross-linked to amine groups in a second polymer backbone.

31. The polymer electrolyte of claim 1 wherein the metal salt is selected from the group consisting of transition metals, alkali metals, alkaline earth metals, or a combination thereof.

32. The polymer electrolyte of claim 31 wherein the metal salt is a transition metal salt selected from the group consisting of Ni, Cu, Ru or Ag.

33. The polymer electrolyte of claim 32 wherein the metal salt is a alkali metal salt selected from the group consisting of Li, Na, K, Rb or Cs.

34. The polymer electrolyte of claim 33 wherein the metal salt is a Li metal salt selected from the group consisting of LiSON, $LiPF_6$, $LiAsF_6$, $LiClO_4$, $LiN(CF_3SO_2)_2$, $LiBF_4$, $LiCF_3SO_3$, $LiSbF_6$, or a combination thereof.

35. The polymer electrolyte of claim 32 wherein the metal salt is a alkaline earth metal salt selected from the group consisting of Mg, Ca or Sr.

36. The polymer electrolyte of claim 1 wherein the polymer has a ratio of secondary to tertiary nitrogen atoms ranging from about 5:1 to about 25:1.

37. The polymer electrolyte of claim 1 wherein the polymer has a ratio of secondary to tertiary nitrogen atoms ranging from about 10:1 to about 20:1.

38. The polymer electrolyte of claim 1 wherein the polymer has a ratio of heteroatoms to metal ions ranging from about 20:1 to about 4:1.

39. The polymer electrolyte of claim 1 wherein the polymer electrolyte comprises a polymer cross-linked with a difunctional alkyl or a difunctional alkylarene compound.

40. The polymer electrolyte of claim 39 wherein the polymer electrolyte comprises a polymer cross-linked with a cross-linker selected from 1,3-dibromopropane, 1,3-diiodohexane, 1,6-dibromohexane, 1,2-dichloroethane, di(bromomethyl)benzenes, and 1,7-heptanediol ditosylate.

41. A covalently cross-linked polymer electrolyte, the polymer electrolyte comprising a polymer backbone containing a linear or branched, substituted or unsubstituted poly(alkylamine), a cross-linker, and one or more solvent moieties covalently bound to (i) said polymer backbone, (ii) a substituent or side chain of said polymer backbone, or (iii) said cross-linker.

42. The polymer electrolyte of claim 41 wherein the polymer is poly(ethylenimine) or poly(propylenimine).

43. The polymer electrolyte of claim 41 wherein one or more of the solvent moieties are bound to amine group nitrogen atoms.

44. The polymer electrolyte of claim 43 wherein the polymer comprises a repeat unit of the formula:

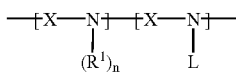

wherein: n is 1 or 2; $R^1$ is (i) free of covalent bonds to the polymer backbone other than the backbone containing the nitrogen atom to which it is covalently bound, and (ii) is a substituted or unsubstituted heterohydrocarbyl solvent moiety derived from a glyme, a furan, an amide, an alkylsulfoxide, a sulfolane, a nitrile or a carbonate; L is a covalent cross-linker connecting N to another polymer chain; and X is independently selected from the group consisting of substituted or unsubstituted hydrocarbylene, and substituted or unsubstituted heterohydrocarbylene.

45. The polymer electrolyte of claim 44 wherein $R^1$ is a solvent moiety derived from tetrahydrofuran, dimethyformamide, dimethylacetamide, N-methylpyrrolidone, dimethylsulfoxide, sulfolane, acetonitrile and propylene carbonate.

46. The polymer electrolyte of claim 44 wherein $R^1$ is a heterohydrocarbyl solvent moiety having the formula —O(CH$_2$CH$_2$O)$_b$CH$_3$, wherein b ranges from about 1 to 6.

47. The polymer electrolyte of claim 41 wherein the polymer further comprises a metal salt.

48. The polymer electrolyte of claim 47 wherein the metal salt is selected from the group consisting of transition metals, alkali metals, alkaline earth metals, or a combination thereof.

49. A covalently cross-linked polymer electrolyte, the polymer electrolyte comprising a polymer backbone containing a linear or branched, substituted or unsubstituted poly(alkylamine), a cross-linker, and labile protons therein in the absence of a protic solvent.

50. The polymer electrolyte of claim 49 wherein a ratio of protons to nitrogen atoms ranges from about 0.2:1 to about 0.8:1.

51. The polymer electrolyte of claim 50 wherein the polymer electrolyte comprises a polymer cross-linked with a malonaldehyde.

52. A fuel cell comprising:
a proton-conducting, covalently cross-linked polymer electrolyte membrane, the polymer electrolyte comprising a polymer backbone containing a linear or branched, substituted or unsubstituted poly(alkylamine), a cross-linker, and labile protons therein in the absence of a protic solvent;
an anode in contact with a first side of the membrane; and,
a cathode in contact with a second side of the membrane, which is opposite said first side.

53. The fuel cell of claim 52 wherein the polymer electrolyte is a substituted or unsubstituted, branched poly(ethylenimine) or poly(propylenimine).

54. The fuel cell of claim 52 wherein the polymer electrolyte is a substituted or unsubstituted, linear poly(ethylenimine) or poly(propylenimine).

55. A battery comprising a negative electrode, a positive electrode, and an ionically conductive polymer electrolyte disposed there between and in contact therewith, wherein said polymer electrolyte is covalently cross-linked and comprises a polymer backbone containing a linear or branched, substituted or unsubstituted poly(alkylamine), a cross-linker, and a dissolved or dispersed metal salt, the cross-linked polymer electrolyte being inert to lithium metal.

56. The polymer electrolyte of claim 55 wherein the polymer electrolyte comprises a polymer cross-linked with a difunctional alkyl or a difunctional alkylarene compound.

57. The polymer electrolyte of claim 56 wherein the polymer electrolyte comprises a polymer cross-linked with a cross-linker selected from 1,3-dibromopropane, 1,3-diiodohexane, 1,6-dibromohexane, 1,2-dichloroethane, di(bromomethyl)benzenes, and 1,7-heptanediol ditosylate.

58. The battery of claim 55 wherein the polymer electrolyte is a substituted or unsubstituted, branched poly(ethylenimine) or poly(propylenimine).

59. The battery of claim 55 wherein the polymer electrolyte is a substituted or unsubstituted, linear poly(ethylenimine) or poly(propylenimine).

60. A gradient battery comprising:
metal ions;
a first current collector;
a negative electrode in contact with said first current collector, said negative electrode comprising a covalently cross-linked, linear or branched, substituted or unsubstituted poly(alkylamine);
a second current collector;
a positive electrode in contact with said second current collector, said positive electrode comprising a covalently cross-linked, linear or branched, substituted or unsubstituted poly(alkylamine); and,
an electrolyte comprising a covalently cross-linked, linear or branched, substituted or unsubstituted poly(alkylamine) disposed between said negative and positive electrodes which, during charge or discharge of the battery, enable the passage of metal ions or protons from one electrode to the other;
wherein said negative electrode, positive electrode and electrolyte are regions within a continuous, covalently cross-linked, linear or branched, substituted or unsubstituted poly(alkylamine) film.

61. The battery of claim 60 wherein the negative electrode, positive electrode and the polymer electrolyte comprise a covalently cross-linked, substituted or unsubstituted, branched poly(ethylenimine) or poly(propylenimine).

62. The battery of claim 60 wherein the negative electrode, positive electrode and the polymer electrolyte comprise a covalently cross-linked, substituted or unsubstituted, linear poly(ethylenimine) or poly(propylenimine).

63. The battery of claim 60 wherein the electrolyte is a covalently cross-linked polymer single ion electrolyte, the polymer electrolyte comprising an ion pair, one member of the pair being covalently attached to the polymer backbone and the other being capable of diffusing through the polymer electrolyte upon the application of an electric field.

64. A covalently cross-linked polymer single ion electrolyte, the polymer electrolyte comprising a polymer backbone containing a linear or branched, substituted or unsubstituted poly(alkylamine), a cross-linker, and an ion pair, one member of the pair being covalently attached to the polymer backbone and the other being capable of diffusing through the polymer electrolyte upon the application of an electric field.

65. The single ion electrolyte of claim 64 wherein the polymer is a substituted or unsubstituted, branched poly(ethylenimine) or poly(propylenimine).

66. The single ion electrolyte of claim 64 wherein the polymer electrolyte is a substituted or unsubstituted, linear poly(ethylenimine) or poly(propylenimine).

67. An electrolytic cell comprising:
an anode,
a cathode, and
a covalently cross-linked polymer single ion electrolyte, the polymer electrolyte comprising a polymer backbone containing a linear or branched, substituted or unsubstituted poly(alkylamine), a cross-linker, and an ion pair, one member of the pair being covalently attached to the polymer backbone and the other being capable of diffusing through the polymer electrolyte upon the application of an electric field.

68. The electrolytic cell of claim 67 wherein the polymer is a substituted or unsubstituted, branched poly(ethylenimine) or poly(propylenimine).

69. The electrolytic cell of claim 67 wherein the polymer electrolyte is a substituted or unsubstituted, linear poly(ethylenimine) or poly(propylenimine).

* * * * *